US012621113B2

(12) United States Patent (10) Patent No.: US 12,621,113 B2
Ganesan et al. (45) Date of Patent: May 5, 2026

(54) SIDELINK INTERLACE CONFIGURATION

(71) Applicant: Lenovo (Singapore) Pte. Ltd., New Tech Park (SG)

(72) Inventors: Karthikeyan Ganesan, Kronberg im Taunus (DE); Alexander Golitschek Edler von Elbwart, Darmstadt (DE); Vijay Nangia, Woodridge, IL (US); Ankit Bhamri, Rödermark (DE); Ali Ramadan Ali, Munich (DE); RObin Thomas, Frankfurt am Main (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 208 days.

(21) Appl. No.: 17/515,266

(22) Filed: Oct. 29, 2021

(65) Prior Publication Data

US 2023/0133612 A1 May 4, 2023

(51) Int. Cl.
*H04L 5/00* (2006.01)
*H04W 16/14* (2009.01)
*H04L 27/26* (2006.01)

(52) U.S. Cl.
CPC .......... *H04L 5/0094* (2013.01); *H04L 5/0035* (2013.01); *H04W 16/14* (2013.01); *H04L 27/26025* (2021.01)

(58) Field of Classification Search
CPC ................. H04L 5/0094; H04L 5/0035; H04L 27/26025; H04W 16/14
See application file for complete search history.

(56) References Cited

U.S. PATENT DOCUMENTS

2021/0219292 A1 * 7/2021 Wang ................ H04W 72/0453
2022/0312385 A1 * 9/2022 Sun ........................ H04W 72/40

FOREIGN PATENT DOCUMENTS

CN        115552835 A  * 12/2022 ............ H04W 72/04
WO    WO-2018090855 A1 *  5/2018 ........... H04L 1/0027
WO    WO-2021189428 A1 *  9/2021 ........... H04W 72/25
(Continued)

OTHER PUBLICATIONS

PCT/IB2022/060490, "Notification of Transmittal of the International Search Report and the Written Opinion of the International Searching Authority, or the Declaration", International Searching Authority, Feb. 7, 2023, pp. 1-12.
(Continued)

*Primary Examiner* — Saad A. Waqas
(74) *Attorney, Agent, or Firm* — Kunzler Needham & Hilton

(57) ABSTRACT

Apparatuses, methods, and systems are disclosed for interlacing sidelink resources. One apparatus includes a transceiver and a processor that receives a resource pool configuration that indicates a subchannel size and resource pool time-frequency configuration for an unlicensed sidelink carrier and receives a corresponding interlacing configuration that indicates: the number of frequency resources per interlace based on the subchannel size, the spacing between the interlace based on the subchannel size, the minimum amount of resource to be used for transmission in a resource pool, and the type of interlacing to be performed. The transceiver transmits a sidelink channel according to the interlacing configuration within the unlicensed sidelink carrier.

18 Claims, 12 Drawing Sheets

(56) References Cited

FOREIGN PATENT DOCUMENTS

| | | | | |
|---|---|---|---|---|
| WO | WO-2021203326 A1 * | 10/2021 | .......... | H04L 5/0007 |
| WO | WO-2023032227 A1 * | 3/2023 | .......... | H04L 5/0055 |

OTHER PUBLICATIONS

3GPP, "3rd Generation Partnership Project; Technical Specification Group Radio Access Network; NR; Physical channels and modulation (Release 16)", 3GPP TS 38.211 V16.7.0, Sep. 2021, pp. 1-134.

3GPP, "3rd Generation Partnership Project; Technical Specification Group Radio Access Network; Evolved Universal Terrestrial Radio Access (E-UTRA); Physical layer procedures (Release 16)", 3GPP TS 36.213 V16.7.0, Sep. 2021, pp. 1-577.

3GPP, "3rd Generation Partnership Project; Technical Specification Group Radio Access Network; NR; Physical layer procedures for control (Release 16)", 3GPP TS 38.213 V16.7.0, Sep. 2021, pp. 1-188.

3GPP, "3rd Generation Partnership Project; Technical Specification Group Radio Access Network; NR; Radio Resource Control (RRC) protocol specification (Release 16)", 3GPP TS 38.331 V16.6.0, Nov. 2021, pp. 1-961.

* cited by examiner

200

1500

| SC#3, RP#1 | SC#7, RP#0 | SC#6, RP#0 | SC#2, RP#1 | SC#5, RP#0 | SC#4, RP#0 | SC#1, RP#1 | SC#3, RP#0 | SC#2, RP#0 | SC#0, RP#1 | SC#1, RP#0 | SC#0, RP#0 |

LBT sub-band

| SC#5, RP#1 | SC#5, RP#0 | SC#4, RP#1 | SC#4, RP#0 | SC#3, RP#1 | SC#3, RP#0 | SC#2, RP#1 | SC#2, RP#0 | SC#1, RP#1 | SC#1, RP#0 | SC#0, RP#1 | SC#0, RP#0 |

LBT sub-band

| SC#5, RP#1 | SC#5, RP#0 | SC#4, RP#1 | SC#4, RP#0 | SC#3, RP#1 | SC#3, RP#0 | SC#2, RP#1 | SC#2, RP#0 | SC#1, RP#1 | SC#1, RP#0 | SC#0, RP#1 | SC#0, RP#0 |

LBT sub-band

FIG. 13

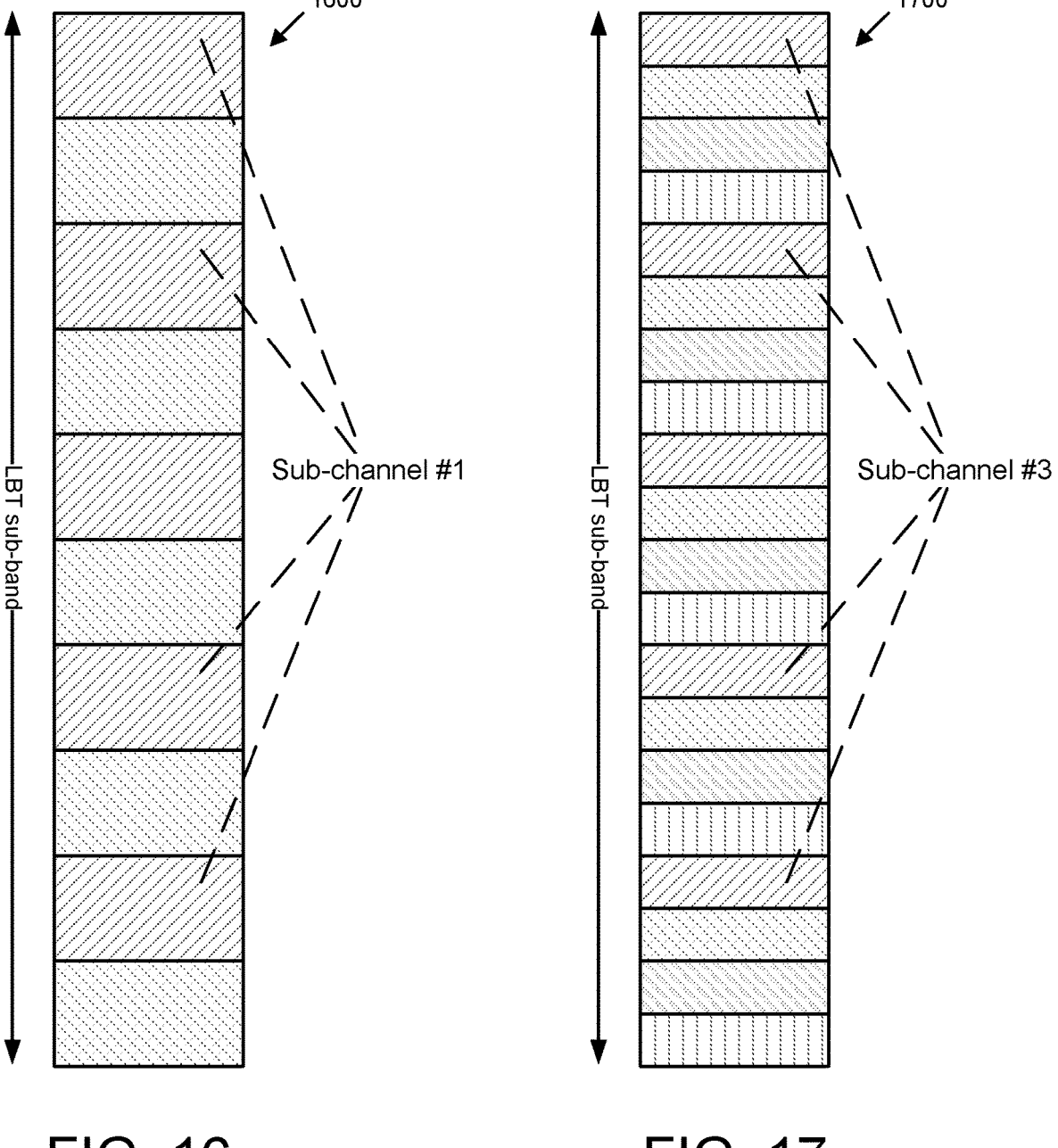
FIG. 16                    FIG. 17

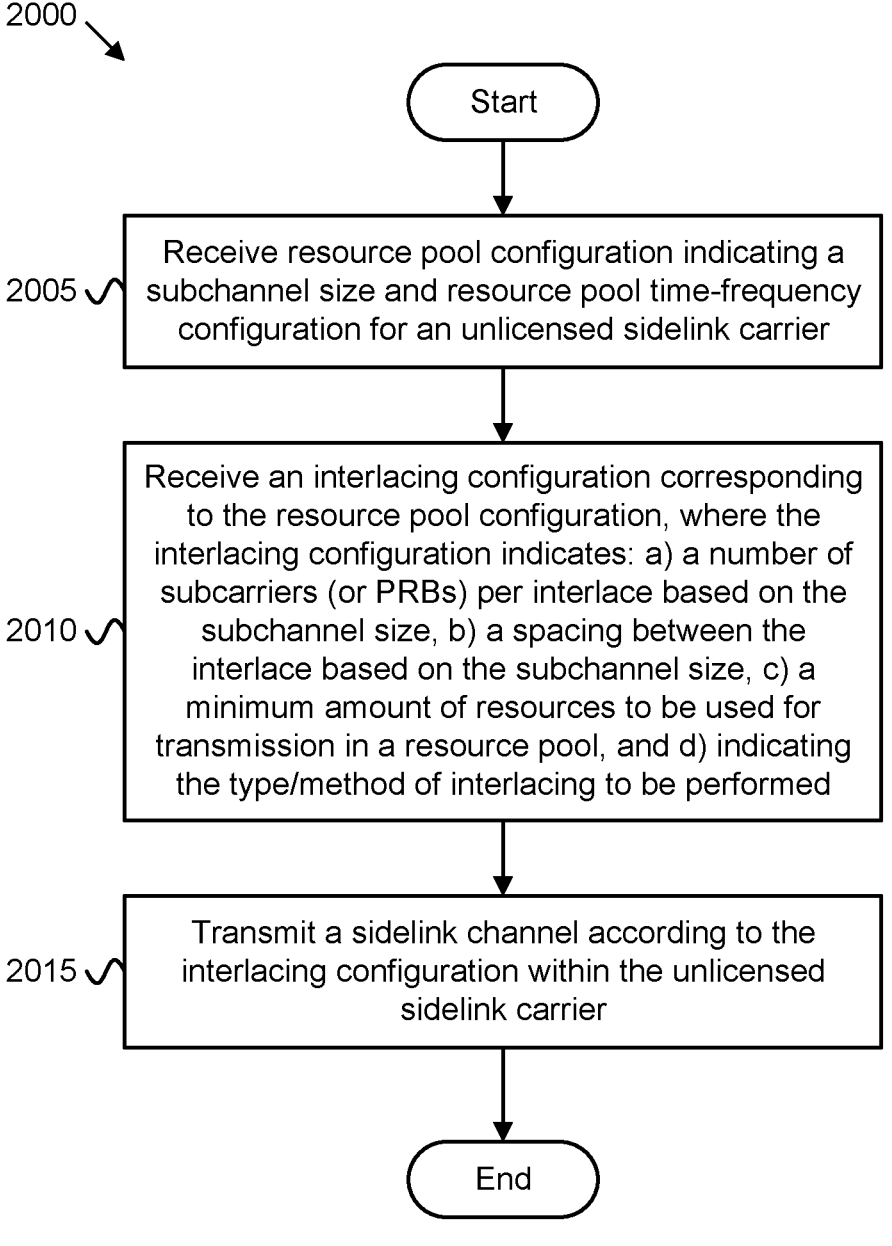

2000

Start

2005 — Receive resource pool configuration indicating a subchannel size and resource pool time-frequency configuration for an unlicensed sidelink carrier 2010 — Receive an interlacing configuration corresponding to the resource pool configuration, where the interlacing configuration indicates: a) a number of subcarriers (or PRBs) per interlace based on the subchannel size, b) a spacing between the interlace based on the subchannel size, c) a minimum amount of resources to be used for transmission in a resource pool, and d) indicating the type/method of interlacing to be performed 2015 — Transmit a sidelink channel according to the interlacing configuration within the unlicensed sidelink carrier End

FIG. 20

SIDELINK INTERLACE CONFIGURATION

FIELD

The subject matter disclosed herein relates generally to wireless communications and more particularly relates to interlacing sidelink resources for operation in unlicensed (i.e., shared) spectrum.

BACKGROUND

In sidelink communication, a User Equipment ("UE") is able to communicate directly with another UE and without relaying its messages via a wireless network.

BRIEF SUMMARY

Disclosed are procedures for configuring interlacing of sidelink resources for operation in shared spectrum. Said procedures may be implemented by apparatus, systems, methods, or computer program products.

One method of a User Equipment ("UE") for interlacing sidelink resources includes receiving a resource pool configuration and receiving an interlacing configuration corresponding to the resource pool configuration. Here, the resource pool configuration indicates a subchannel size and resource pool time-frequency configuration for an unlicensed sidelink carrier. Additionally, the interlacing configuration indicates: a) the number of frequency resources (e.g., subcarriers or Physical Resource Blocks ("PRBs")) per interlace based on the subchannel size, b) the spacing between the interlace based on the subchannel size, c) the minimum amount of resource to be used for transmission in a resource pool, and d) the type/method of interlacing to be performed. The method includes transmitting a sidelink channel according to the interlacing configuration within the unlicensed sidelink carrier, where the sidelink channel comprises at least one of: a sidelink data channel and a sidelink control channel.

One method of a network entity for interlacing sidelink resources includes transmitting a resource pool configuration to a UE, where the resource pool configuration indicates a subchannel size and resource pool time-frequency configuration for an unlicensed sidelink carrier. The method also includes transmitting an interlacing configuration corresponding to the resource pool configuration to the UE, where the interlacing configuration indicates: a) the number of subcarriers (or PRBs) per interlace based on the subchannel size, b) the spacing between the interlace based on the subchannel size, c) the minimum amount of resource to be used for transmission in a resource pool, and d) the type/method of interlacing to be performed.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 13 is a diagram illustrating one embodiment of an eleventh interlacing scheme for sidelink operation;

FIG. 14 is a diagram illustrating one embodiment of a twelfth interlacing scheme for sidelink operation;

FIG. 15 is a diagram illustrating one embodiment of a thirteenth interlacing scheme for sidelink operation;

FIG. 16 is a diagram illustrating one embodiment of a fourteenth interlacing scheme for sidelink operation;

FIG. 17 is a diagram illustrating one embodiment of a fifteenth interlacing scheme for sidelink operation;

FIG. 20 is a flowchart diagram illustrating one embodiment of a first method for interlacing sidelink resources.

DETAILED DESCRIPTION

Figure 1:
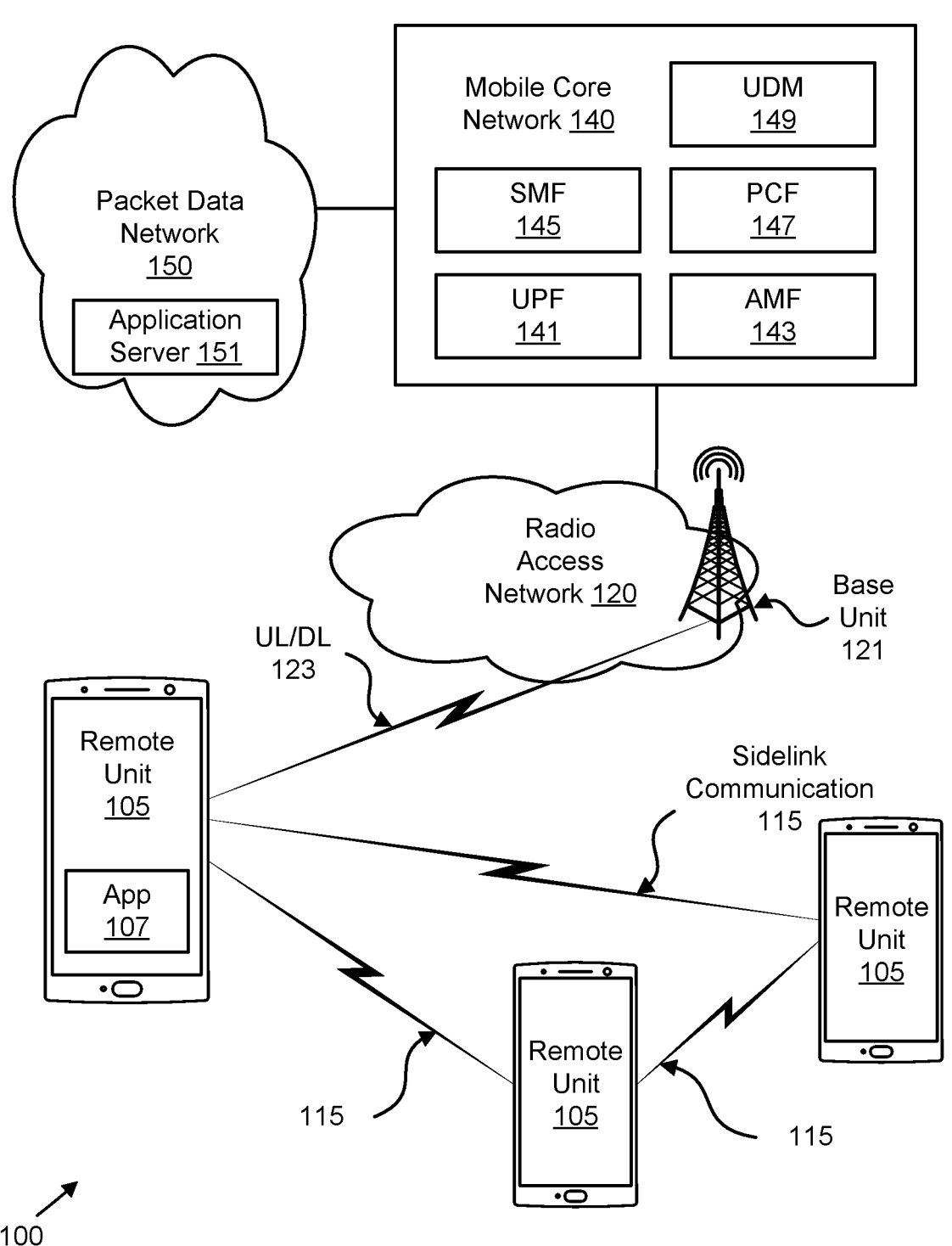
FIG. 1 is a block diagram illustrating one embodiment of a wireless communication system for interlacing sidelink resources.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for interlacing sidelink resources. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Future wireless devices may support sidelink operation on unlicensed spectrum. For uplink/downlink operation over the unlicensed spectrum, e.g., for channels such as Physical Uplink Shared Channel ("PUSCH"), Physical Uplink Control Channel ("PUCCH") format 2, etc., transmissions are to meet the Power Spectrum Density ("PSD") regulation and minimum channel occupancy requirement (e.g., 80%). To fulfill these regulations, interlacing schemes may be used in LTE-unlicensed and NR-unlicensed that interlace physical channels, e.g., PUSCH and PUCCH channels, at resource block level.

Regarding sidelink resource allocation, the minimum scheduling unit (i.e., defined by subchannel consisting of 'N' PRBs and 'M' subchannels) constitutes a resource pool. Each sidelink ("SL") carrier contains one SL Bandwidth Part ("BWP") which is then associated with multiple transmission ("Tx") Resource pools containing different configuration of the subchannel sizes {n10, n12, n15, n20, n25, n50, n75, n100}. The minimum scheduling unit of subchannel for sidelink contradicts that of uplink which is based on Resource Block ("RB") level scheduling unit and each resource pool in sidelink does not span across entire bandwidth ("BW") or Listen-Before-Talk ("LBT") subbands which is the requirement for minimum occupancy and PSD limit.

To meet the regulatory requirements of PSD and the minimum channel occupancy (80%), sidelink unlicensed operation requires interlacing of subchannels and/or resource pools. However, another challenge of sidelink unlicensed operation is that the UE is not expected to use the remaining PRBs (i.e., not large enough for a full subchannel) in Rel-16 sidelink design, which is problematic for unlicensed operation as it might not meet the minimum occupancy requirement.

To support sidelink operation in shared (i.e., unlicensed) spectrum, the below solutions describe mechanisms to meet the regulatory requirements of PSD and minimum channel occupancy.

According to a first solution, each sidelink resource pool is configured to occupy the minimum occupied bandwidth (e.g., 20 MHz BW) using an interlacing configuration. The number of frequency resources (i.e., subchannels or PRBs) per interlace is represented by N and the spacing between interlace is represented by M, where the values of M and N are configured per resource pool based on the configured subchannel size. In certain embodiments, the interlacing itself is implemented on a subchannel-wise basis.

According to a second solution, when more than one resource pool configured to occupy the minimum occupied bandwidth for e.g., 20 MHz then number of resource pool occupying the LBT subband of 20 MHz bandwidth could be interleaved such that each interleaved resource pool occupies the entire LBT sub-band.

According to a third solution, the sidelink subchannel may be defined using non-contiguous frequency resources based on an interleaving of PRBs (or PRB groups) within a resource pool, thereby spreading the subchannel across a resource pool (in frequency domain).

In some embodiments, interlacing restrictions may be applied considering remaining PRBs i.e., not large enough for a full subchannel thereby named as empty PRBs. In one embodiment, the remaining PRBs are allocate as empty PRBs which may be configured towards the middle/center of the resource pool. In another embodiment, the remaining PRBs are incorporated into one or more subchannels, such that the resource pool is configured with mixed subchannel sizes.

In some embodiments, interlacing restrictions may be applied considering larger subchannel sizes. In one embodiment, a UE is configured with minimum amount of resource (subchannel/PRB) to be used for transmission in a resource pool considering the minimum occupied bandwidth and PSD limit. In another embodiment, the UE is configured with PRB interlacing within and across subchannel.

In certain embodiments, a UE is configured with an interlacing scheme where frequency resources are allocated beginning from both edges of the resource pool and working towards the middle/center of the resource pool. In certain embodiments, the UE is configured with an interlacing scheme where frequency resources are allocated beginning from the lowest PRB/PRB group in each of the subchannel in a resource pool and, after finishing all subchannels, then allocating the second lowest PRB/PRB group in each subchannel in a resource pool.

FIG. 1 depicts a wireless communication system 100 for interlacing sidelink resources, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the Fifth Generation ("5G") system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or Packet Data Network ("PDN") connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may concurrently have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a PDN connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5G core ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR", also referred to as "Unified Data Repository"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Stratum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) Internet Protocol ("IP") address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the Fifth Generation Core network ("5GC"). When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for interlacing sidelink resources apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In various embodiments, the remote units 105 may communicate directly with each other (e.g., device-to-device communication) using sidelink communication signals 115. Here, sidelink transmissions may occur on sidelink resources. As discussed above, a remote unit 105 may be provided with different sidelink communication resources for different allocation modes. Mode-1 corresponds to a NR-based network-scheduled sidelink communication mode, wherein the in-coverage RAN 120 indicates resources for use in sidelink operation, including resources of one or more resource pools. Mode-2 corresponds to a NR-based UE-scheduled sidelink communication mode (i.e., UE-autonomous selection), where the remote unit 105 select a resource pools and resources therein from a set of candidate pools. Mode-3 corresponds to an LTE-based network-scheduled sidelink communication mode. Mode-4 corresponds to an LTE-based UE-scheduled sidelink communication mode (i.e., UE-autonomous selection).

In the following descriptions, the term "RAN node" is used for the base station/base unit, but it is replaceable by any other radio access node, e.g., gNB, ng-eNB, eNB, Base Station ("BS"), Access Point ("AP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for interlacing sidelink resources.

Figure 2A:
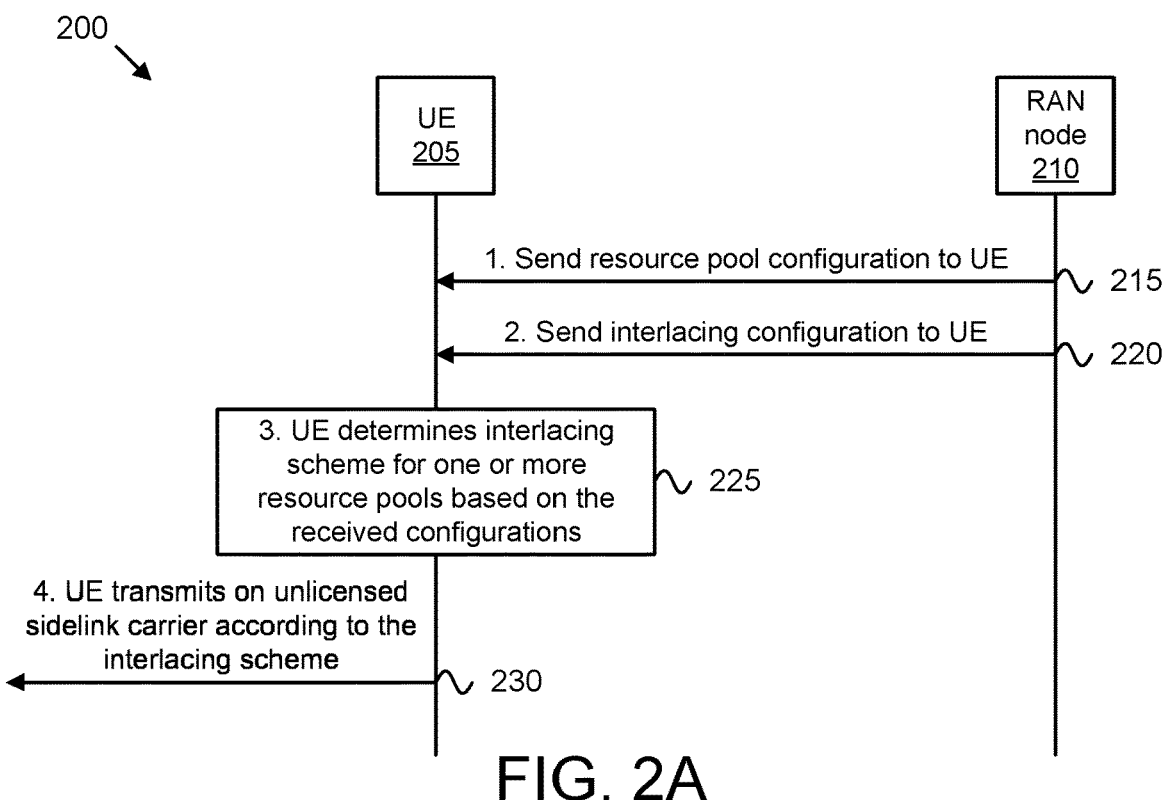
FIG. 2A is a diagram illustrating one embodiment of configuring a resource pool ("RP") interlacing scheme.

FIG. 2A depicts a procedure 200 for configuring a resource pool interlacing scheme for sidelink operation in shared spectrum, according to embodiments of the disclosure. The procedure 200 involves a UE 205 and a RAN node 210 in a mobile communication network. Here, the UE 205 may be an embodiment of the remote unit 105, while the RAN node 210 may be an embodiment of the base unit 121.

At Step 1, the UE 205 receives a resource pool configuration, e.g., from the RAN node 210 (see messaging 215). Here, the resource pool configuration indicates at least a subchannel size and a time-frequency configuration for the resource pool. In one embodiment, the resource pool configuration may include a bitmap of time slots and frequency resources corresponding to the resource pool.

As used herein, a "resource pool" refers to a set of resources assigned for sidelink operation. A resource pool consists of a set of resource blocks (i.e., Physical Resource Blocks ("PRB")) over one or more time units (e.g., subframe, slots, Orthogonal Frequency Division Multiplexing ("OFDM") symbols). In some embodiments, the set of resource blocks comprises contiguous PRBs in the frequency domain. As used herein, a PRB refers to twelve consecutive subcarriers in the frequency domain. In certain embodiments, a UE may be configured with separate transmission resource pools ("Tx RPs") and reception resource pools ("Rx RPs"), where the Tx RP of one UE is associated with an Rx RP of another UE (i.e., peer UE) to enable sidelink communication.

At Step 2, the UE 205 receives an interlacing configuration corresponding to the resource pool configuration (see messaging 220). In various embodiments, the interlacing configuration indicates a number of frequency resources per interlace (denoted using parameter 'N') and a spacing between each interlace (denoted using parameter 'M'). As noted above, the values of M and N are based on the subchannel size indicated in the resource pool configuration. Additionally, the interlacing configuration indicates a minimum amount of (frequency) resources to be used for transmission in a resource pool and a type (or method) of interlacing to be used (e.g., subchannel interlacing, PRB interleaving, subchannel interleaving, etc.).

At Step 3, the UE 205 determines an interlacing scheme for one or more resource pools based on the received configurations (see block 225). In one embodiment, the UE 205 applies the interlacing configuration to the resource pool configuration to derive the particular interlacing scheme to use on the unlicensed sidelink carrier.

At Step 4, the UE 205 transmits sidelink data in a resource pool to a peer UE on an unlicensed (i.e., shared spectrum) sidelink carrier, following the determined interlacing scheme (see messaging 230).

While FIG. 2A depicts the UE 205 receiving the resource pool configuration from the network (i.e., from the RAN node 210), in other embodiments the resource pool configuration may be pre-configured in the UE 205.

Figure 2B:
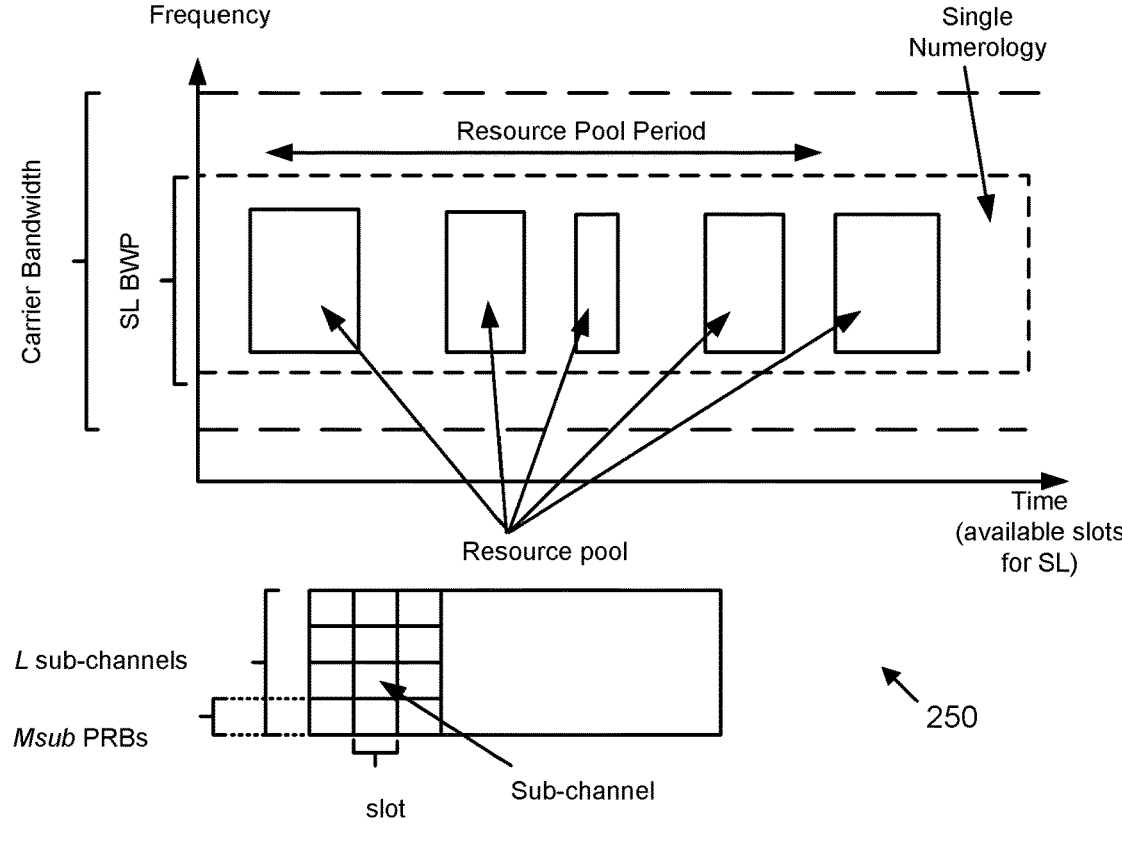
FIG. 2B is a diagram illustrating one embodiment of a resource pool for sidelink operation.

FIG. 2B depicts one example of a Resource Pool 250 for sidelink communication, according to embodiments of the disclosure. Each SL carrier contains one SL BWP which is then associated with multiple Tx Resource pools containing different configuration of the subchannel sizes, i.e., {n10, n12, n15, n20, n25, n50, n75, n100}. A resource pool structure (pre)configuration contains subchannel size and bitmap of time slot and frequency resource.

Regarding the subchannel size configuration for a resource pool, for the number of PRBs for resource pool, a SL BWP may configure all the number of PRBs. In certain embodiments, the configured PRBs for a resource pool is not a multiple of subchannel size such that there is a set of remaining PRBs that is too small to form a subchannel of the configured subchannel size. In one embodiment, the remaining PRBs may be allocated as empty (i.e., zero-power) PRBs located at or near the resource pool center frequency. In another embodiment, the resource pool is configured with mixed subchannel size, such that the "remaining" PRBs are assigned to one or more subchannels.

Described herein are solutions for sidelink operation over the unlicensed spectrum that meets regulatory requirements, e.g., of Power Spectrum Density ("PSD") and the minimum channel occupancy (80%) regulations. In various embodiments, the UE is configured with a resource pool interlacing scheme to occupy minimum occupied bandwidth, minimum subchannel size(s) allocation to a UE for transmission could cover the minimum occupied bandwidth, subchannel wise interlacing and doing both subchannel and resource pool wise interlacing, restriction on configuring interlacing, especially considering larger subcarrier spacing ("SC S") values and larger subchannel sizes.

According to embodiments of the first solution, each Resource Pool ("RP") is configured to occupy the minimum occupied bandwidth (e.g., 20 MHz bandwidth) and interlacing is performed on a subchannel-wise basis.

In various embodiments, the interlacing structure design (i.e., interlacing scheme) for sidelink defines the number of subchannels per interlace (N) and the spacing between the interlace (M), where the values of (N) and (M) vary depending on the subchannel size. As noted above, the interlacing structure design may be (pre)configured per resource pool. Alternatively, the interlacing structure design may be configured by the network. In certain embodiments, the subchannel size of a resource pool is (pre)configured per resource pool.

In some embodiments, there may be configuration restrictions while configuring the interlacing structure for a resource pool considering larger subchannel size(s) such as 50, 75, 100 PRBs to satisfy the minimum occupancy bandwidth.

In one implementation, the UE 205 may be configured to transmit in a minimum number of PRBs considering one or more subchannels configured in a resource pool, where the minimum number of PRBs satisfies the minimum occupancy requirement (e.g., 80%) and PSD limit. In some embodiments, the minimum number of PRBs for transmission in a resource pool is configured (or pre-configured) per resource pool. In certain embodiments, the size of a transport block ("TB") containing sidelink data may be less than the subchannel size. In such embodiments, the UE 205 may repeat the same TB in different PRBs in same or different subchannels in order to cover the minimum number of occupied bandwidths.

In another implementation, the interlacing structure design defines PRB-level interlacing within a subchannel. In some embodiments, the parameter indicating the number of PRBs per interlace (denoted N') and the spacing between the interlaces (denoted M') may be configured (or pre-configured) for that subchannel in a resource pool.

Figure 3:
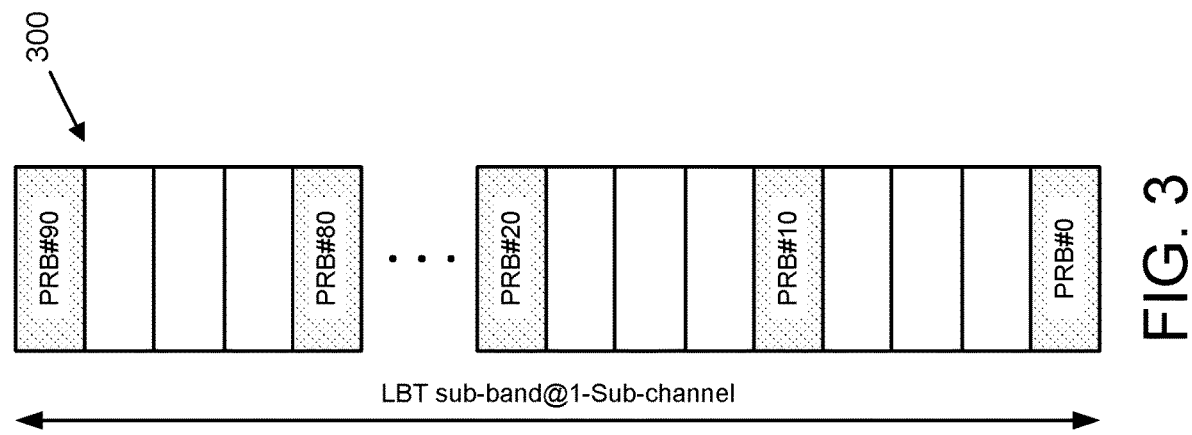
FIG. 3 is a diagram illustrating one embodiment of a first interlacing scheme for sidelink operation.

FIG. 3 depicts an example interlacing structure design 300 with PRB-level interlacing across a subchannel, according to embodiments of the disclosure. In some embodiments, when there is only one subchannel within the LBT sub-band then the interlacing is performed within that subchannel. It is assumed that the LBT sub-band spans 100 PRBs (i.e., from PRB index #0 to PRB index #99) with SCS=15 kHz. As depicted, the interlacing structure comprises one PRB in ten, for example PRBs #0, #10, #20, #30, #40, #50, #60, #70, #80, and #90. For the depicted example, N'=10, M'=10, and the starting PRB index=0.

Figure 4:
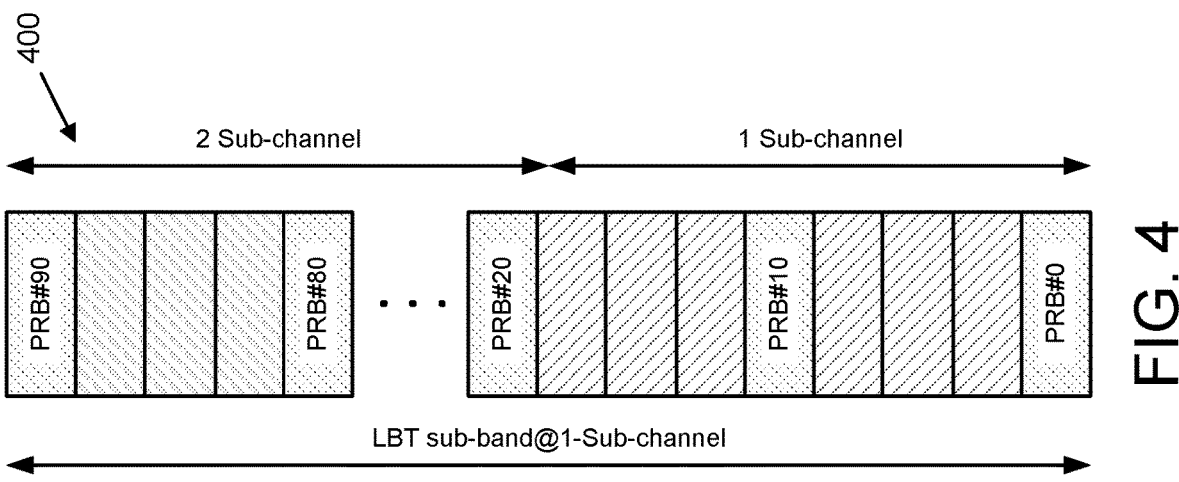
FIG. 4 is a diagram illustrating one embodiment of a second interlacing scheme for sidelink operation.

FIG. 4 depicts another example interlacing structure design 400 with PRB-level interlacing across a subchannel, according to embodiments of the disclosure. In some embodiments, when there are more than one subchannels within the LBT sub-band, then the interlacing is performed across more than one subchannels to satisfy the minimum occupied bandwidth criteria. It is assumed that the LBT sub-band spans 100 PRBs (i.e., from PRB index #0 to PRB index #99) with SCS=15 kHz. Here, the first subchannel comprises at least PRB index #0 to PRB index #20 and the second subchannel comprises at least PRB index #80 to PRB index #99. In one embodiment, the first and second subchannels are of equal size. In another embodiment, the first and second subchannels are of different sizes. As depicted, the interlacing structure comprises one PRB in ten, for example PRBs #0, #10, #20, #30, #40, #50, #60, #70, #80, and #90. For the depicted example, N'=10, M'=10, and the starting PRB index=0.

In another implementation, the interlacing structure design may be interlaced subchannel-wise such that the UE 205 starts allocating resources from both edges of a resource pool, i.e., from the start of the subchannel in the resource pool (i.e., lowest subchannel ("SC") index), then followed by allocating resource towards end of the subchannel in a resource pool, and finally the remaining allocation could be in the middle/center subchannel in a resource pool. In another example, the UE 205 may begin allocation PRB-wise from both edges of the PRBs in a subchannel and finally from the middle/center PRBs in a subchannel.

Figure 5:
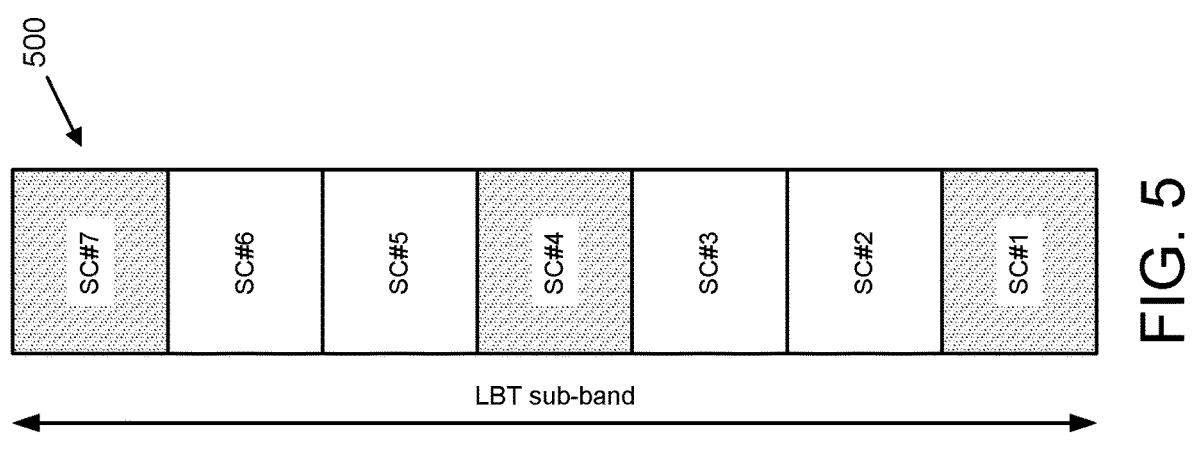
FIG. 5 is a diagram illustrating one embodiment of a third interlacing scheme for sidelink operation.

FIG. 5 depicts another example interlacing structure design 500 with subchannel-level interlacing across a resource pool, according to embodiments of the disclosure. Here, it is assumed that the resource pool is comprises of at least seven subchannels. The subchannels may be of equal size or may be of different sizes, e.g., according to the principles described below. In the depicted embodiments, the interlacing structure comprises the lowest subchannel index (e.g., SC #1), the highest subchannel index (e.g., SC #7), and at least one subchannel in the middle of the resource pool (e.g., SC #4).

In another implementation, interlacing structure design may be interlaced such that UE 205 starts allocation with the lowest PRB (or PRB group) in each of the subchannel in a resource pool and, after finishing all subchannel, then allocating the second lowest PRB/PRB group in each subchannel in a resource pool. In one example, the first interlace is formed from the lowest PRB/PRB group from each subchannel, the second interlace is formed from the second lowest PRB/PRB group from each subchannel, and so on. In certain embodiments, a PRB group is added as a parameter in the Radio Resource Control ("RRC") resource pool (pre)configuration.

Turning again to FIG. 4, the first interlace (i.e., Interlace #0) comprises PRB indices: #0, #10, #20, #30, #40, #50, #60, #70, #80, and #90, while the second interlace (i.e., Interlace #1) comprises PRB indices: #1, #11, #21, #31, #41, #51, #61, #71, #81, and #91, and so forth.

In some embodiments, the UE 205 is not expected to use the remaining PRBs (i.e., those not large enough for a full subchannel) if the configured PRBs for resource pool is not a multiple of subchannel size. These unused remaining PRBs become empty PRBs; however, not utilizing those empty PRBs may cause problem with the satisfying the minimum occupied bandwidth requirement for the unlicensed sidelink operation.

According to a first option, a resource pool may be configured with the empty PRBs in the middle/center of the resource pool. In certain embodiments, a parameter is introduced as part of the resource pool (pre)configuration in RRC indicating the bitmap of the PRBs (or PRB group(s)) belonging to the empty PRBs.

Figures 6, 7:
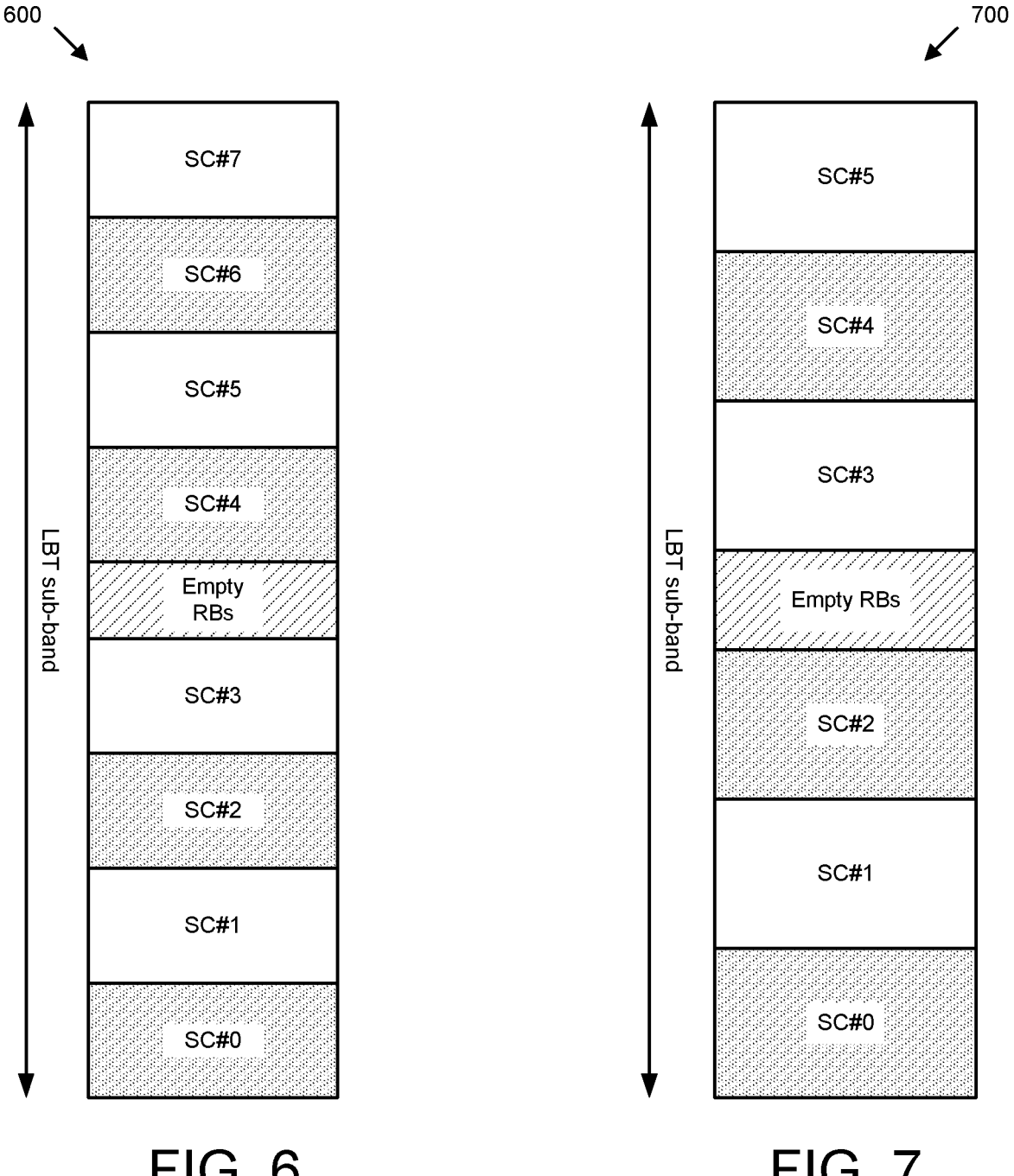
FIG. 6 is a diagram illustrating one embodiment of a fourth interlacing scheme for sidelink operation.
FIG. 7 is a diagram illustrating one embodiment of a fifth interlacing scheme for sidelink operation.

FIG. 6 depicts an example interlacing structure design 600 with empty PRBs in the middle/center of the resource pool, according to embodiments of the disclosure. Here, is assumed that the LBT sub-band spans 100 PRBs (i.e., from PRB index #0 to PRB index #99) with SCS=15 kHz and the resource pool is divided into eight (8) subchannels of equal size (i.e., 12 PRBs). However, because the configured PRBs for the resource pool (i.e., 100 PRBs) is not a multiple of subchannel size (i.e., 12 PRBs), there is a set of remaining PRBs (i.e., 4 PRBs) that is too small to form a subchannel of the configured subchannel size. Accordingly, the interlacing structure design 600 is configured with the four middle-most PRBs (i.e., PRB indices #48 to #51) as empty PRBs. For the depicted example, M=2 and N=4, with PRB indices #48 to #51 being empty.

FIG. 7 depicts another example interlacing structure design 700 with empty PRBs in the middle/center of the resource pool, according to embodiments of the disclosure. Here, is assumed that the LBT sub-band spans 100 PRBs (i.e., from PRB index #0 to PRB index #99) with SCS=15 kHz and the resource pool is divided into six (6) subchannels of equal size (i.e., 15 PRBs). However, because the configured PRBs for the resource pool (i.e., 100 PRBs) is not a multiple of subchannel size (i.e., 15 PRBs), there is a set of remaining PRBs (i.e., 10 PRBs) that is too small to form a subchannel of the configured subchannel size. Accordingly, the interlacing structure design 700 is configured with the ten middle-most PRBs (i.e., PRB indices #45 to #54) as empty PRBs. For the depicted example, M=2 and N=3, with PRB indices #45 to #55 being empty.

Figures 8, 9, 10:
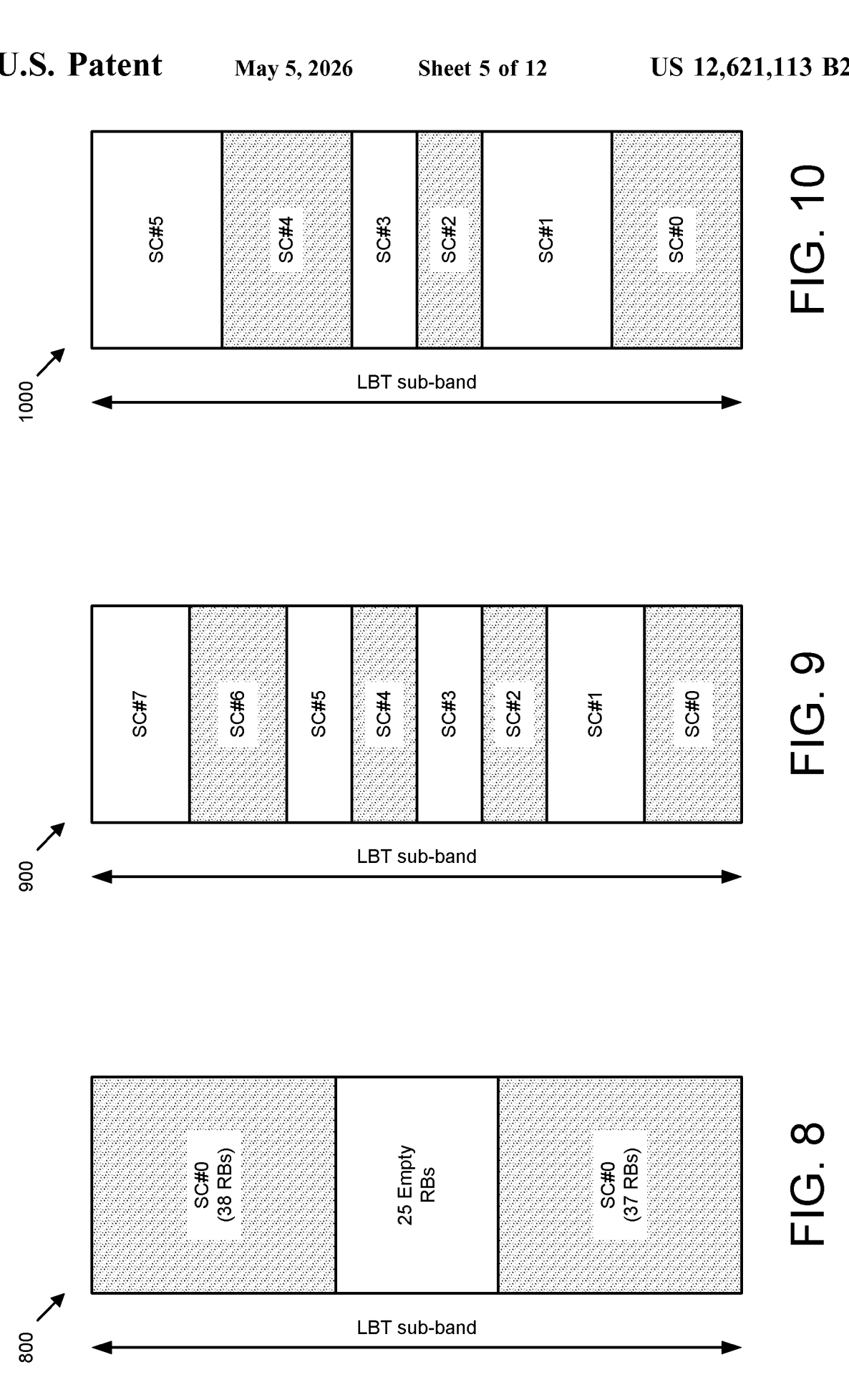
FIG. 8 is a diagram illustrating one embodiment of a sixth interlacing scheme for sidelink operation.
FIG. 9 is a diagram illustrating one embodiment of a seventh interlacing scheme for sidelink operation.
FIG. 10 is a diagram illustrating one embodiment of an eighth interlacing scheme for sidelink operation.

FIG. 8 depicts a further example interlacing structure design 800 with empty PRBs in the middle/center of the resource pool, according to embodiments of the disclosure. Here, is assumed that the LBT sub-band spans 100 PRBs (i.e., from PRB index #0 to PRB index #99) with SCS=15 kHz and the resource pool is divided into a single, distributed subchannel of size smaller than the LBT sub-band. In the depicted example, the single subchannel is of size 75 PRBs, therefore there is a set of 25 remaining PRBs that is too small to form a subchannel of the configured subchannel size. Accordingly, the interlacing structure design 600 is configured with the 25 middle-most PRBs (i.e., PRB indices #37 to #61) as empty PRBs.

According to a second option, the resource pool may be configured with more than one subchannel sizes (i.e., a resource pool with the mixed subchannel sizes). In certain embodiments, a bitmap is added in the RRC resource pool (pre)configuration, the new bitmap containing subchannel number from the lowest subchannel to the highest subchannel for each subchannel size.

FIG. 9 depicts an example interlacing structure design 900 with mixed subchannel sizes, according to embodiments of the disclosure. Here, is assumed that the LBT sub-band spans 100 PRBs (i.e., from PRB index #0 to PRB index #99) with SCS=15 kHz and the resource pool is divided into eight (8) subchannels of mixed size. For this resource pool configuration, the default subchannel size is 12 PRBs. However, because the configured PRBs for the resource pool (i.e., 100 PRBs) is not a multiple of the default subchannel size (i.e., 12 PRBs), there is a set of remaining PRBs (i.e., 4 PRBs) that is too small to form a subchannel of the configured subchannel size.

Accordingly, the interlacing structure design 900 is configured with mixed subcarrier size such that the two lowest subchannels (i.e., SC #0 and SC #1) and the two highest subchannels (i.e., SC #6 and SC #7) are each allocated an extra PRB, thereby forming subchannels of size 13 PRBs. In an alternative configuration, the lowest subchannel (i.e., SC #0) and the highest subchannel (i.e., SC #7) are each allocated two extra PRBs, thereby forming subchannels of size 14 PRBs. Note that the interlacing configuration may indicate the size and locations of the larger subchannels (i.e., having non-default size) or, alternatively, of the size and locations of the smaller subchannels.

FIG. 10 depicts an example interlacing structure design 1000 with mixed subchannel sizes, according to embodiments of the disclosure. Here, is assumed that the resource pool is divided into six (8) subchannels of mixed size. In one embodiment, the LBT sub-band spans 100 PRBs (i.e., from PRB index #0 to PRB index #99) with SCS=15 kHz. For this resource pool configuration, the default subchannel size is 20 PRBs. Although the configured PRBs for the resource pool (i.e., 100 PRBs) is a multiple of the default subchannel size (i.e., 20 PRBs), one subchannel/group of 20 PRBs is split into two subchannels of size 10 PRBs to distribute frequency resources more evenly during subchannel-level interlacing.

In another embodiment, the LBT sub-band spans 50 PRBs (i.e., from PRB index #0 to PRB index #49) with SCS=30 kHz. For this resource pool configuration, the default subchannel size is 10 PRBs. Although the configured PRBs for the resource pool (i.e., 50 PRBs) is a multiple of the default subchannel size (i.e., 10 PRBs), one subchannel/group of 10 PRBs is split into two subchannels of size 5 PRBs to distribute frequency resources more evenly during subchannel-level interlacing.

Accordingly, the interlacing structure design 1000 is configured with mixed subcarrier size such that the two lowest subchannels (i.e., SC #0 and SC #1) and the two highest subchannels (i.e., SC #4 and SC #5) are the default size (i.e., 20 PRBs or 10 PRBs), while the two middle subchannels (i.e., SC #2 and SC #3) are the smaller size (i.e., 10 PRBs or 5 PRBs). Note that the interlacing configuration may indicate the size and locations of the smaller subchannels (i.e., having non-default size) or, alternatively, of the size and locations of the larger subchannels.

In some embodiments, the resource pool configuration uses smaller subchannel sizes (i.e., as compared to subchannel size defined in 3GPP Release 16) to benefit from evenly distributed of resources across the LBT sub-bands. For example, subchannel sizes of 4 and 5 for different subcarrier spacing (e.g., 15 kHz and 30 kHz) may be introduced for interlacing structure designs supporting unlicensed sidelink operation.

Considering the above options for the sidelink unlicensed operation, an exemplary example of interlacing configuration for a resource pool configured with a 20 MHz bandwidth considering different subchannel sizes from 4, 5, 10 PRBs (i.e., smaller than the 3GPP Rel-16 subchannel size of 12 PRBs) for sub-carrier spacing of 15 kHz is shown in the below Table 1.

TABLE 1

| Sidelink Interlacing configuration for a resource pool with 20 MHz BW (100 PRBs@15 KHz SCS) | | |
|---|---|---|
| Subchannel size (PRBs) | Number of subchannels in a resource pool | Interlacing structure examples considering 15 KHz SCS |
| 4 | 25 | M = 5, N = 5<br>Interlace #0 = SC #0, 5, 10, 15, 20<br>Interlace #1 = SC #1, 6, 11, 16, 21<br>Interlace #2 = SC #2, 7, 12, 17, 22<br>Interlace #3 = SC #3, 8, 13, 18, 23<br>Interlace #4 = SC #4, 9, 14, 19, 24 |
| 5 | 20 | M = 4, N = 5<br>Interlace #0 = SC #0, 4, 8, 12, 16<br>Interlace #1 = SC #1, 5, 9, 13, 17<br>Interlace #2 = SC #2, 6, 10, 14, 18<br>Interlace #3 = SC #3, 7, 11, 15, 19 |
| 10 | 10 | M = 2, N = 5<br>Interlace 0 SC #0, 2, 4, 6, 8<br>Interlace 1 SC #1, 3, 5, 7, 9 |

Considering the above options for the sidelink unlicensed operation, an exemplary example of interlacing configuration for a resource pool configured with a 20 MHz bandwidth considering different subchannel sizes from 12, 15, 20, 25 PRBs for sub-carrier spacing of 15 kHz is shown in the below Table 2.

TABLE 2

| Sidelink Interlacing configuration for a resource pool with 20 MHz BW (100 PRBs@15 KHz SCS) | | | |
|---|---|---|---|
| Subchannel size (PRBs) | Number of subchannels in a resource pool | Remaining PRBs | Interlacing structure examples considering 15 KHz SCS |
| 12 | 8 | 4 | Option 1:<br>M = 2, N = 4 and configure Middle/Center of RP with 4 empty PRBs as shown in the FIG. 6.<br>Interlace #0 = SC #0, 2, 4, 6<br>Interlace #1 = SC #1, 3, 5, 7<br>Option 2:<br>Remaining PRBs are allocated to one or more interlaces for resource allocation as shown in FIG. 9. E.g., |

TABLE 2-continued

Sidelink Interlacing configuration for a resource
pool with 20 MHz BW (100 PRBs@15 KHz SCS)

Figures 11, 12:
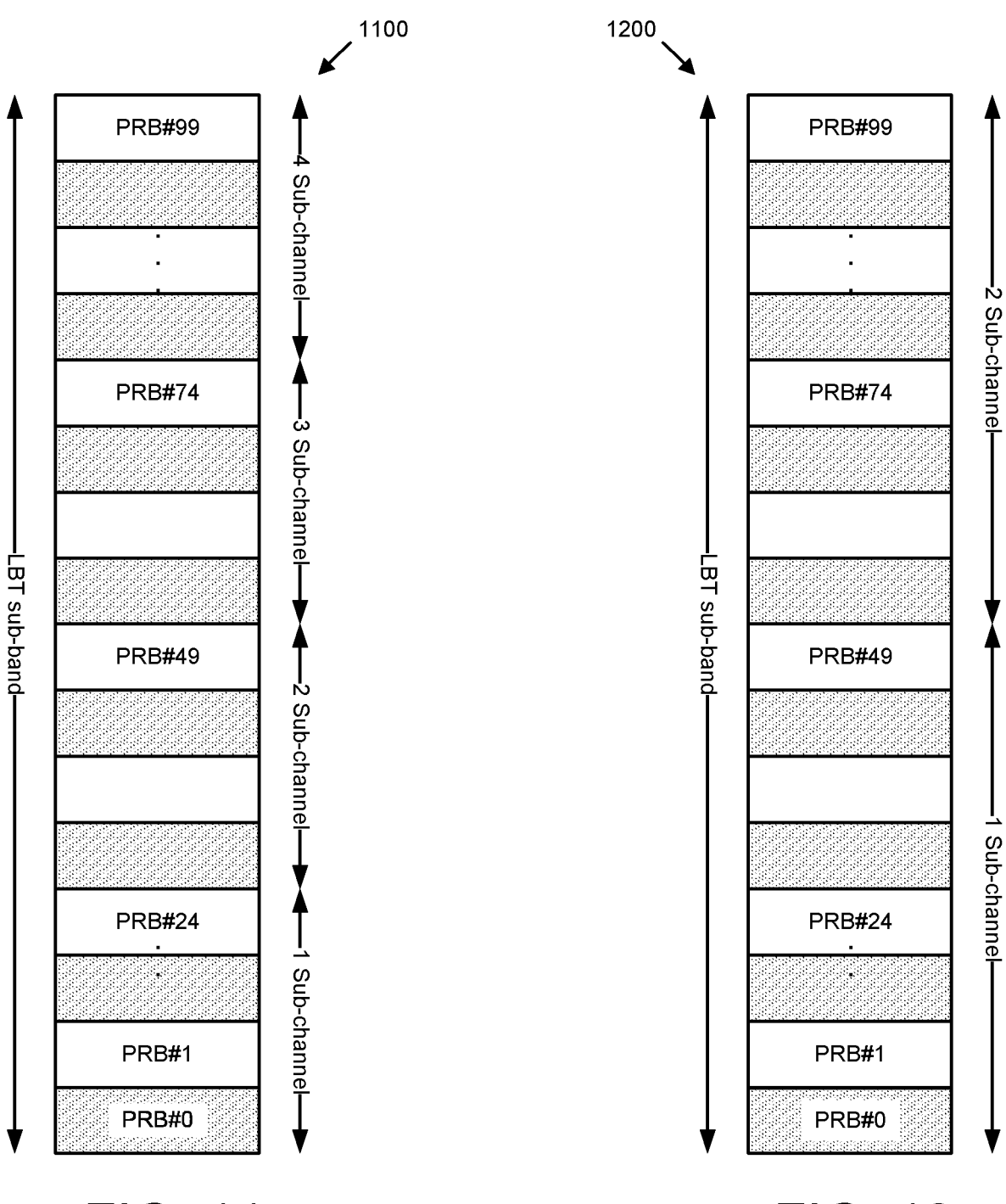
FIG. 11 is a diagram illustrating one embodiment of a ninth interlacing scheme for sidelink operation.
FIG. 12 is a diagram illustrating one embodiment of a tenth interlacing scheme for sidelink operation.

| Subchannel size (PRBs) | Number of subchannels in a resource pool | Remaining PRBs | Interlacing structure examples considering 15 KHz SCS |
|---|---|---|---|
| 15 | 6 | 10 | SC #0, 1, 6, 7 can be configured with 13 PRBs each<br>Alt., SC #0, 7 can be configured with 14 PRBs each<br>Option 1:<br>M = 2, N = 3 and configure Middle/Center of RP with 10 empty PRBs as shown in the FIG. 7<br>Interlace #0 = SC #0, 2, 4<br>Interlace #1 = SC #1, 3, 5 |
| 20 | 5 | 0 | Option 1:<br>M = 2, N = 3 where the one remaining subchannel of 20 PRBs can be split into two subchannel of 10 PRBs each, with 6 subchannels with 4 SC having 20 PRBs each and 2 SC having 10 RBs each as shown in FIG. 10.<br>Or<br>Interleave 20 into two parts of 10 PRBs or into four parts of 5 PRBs and then use above allocation |
| 25 | 4 | 0 | Option 1:<br>M = 1, N = 4<br>Only one interlace<br>Option 2:<br>PRB/PRB group level interlacing configured across subchannel as shown in FIG. 11. Another example of the interlacing configuration is UE may start allocation with the lowest PRB/PRB group in each of the subchannel in a resource pool and after finishing all subchannel then the second lowest PRB/PRB group in each subchannel in a resource pool.<br>Option 3:<br>UE may start PRB/PRB group/subchannel allocation from both edge of the resource pool and then from the middle/center of the resource pool.<br>Or<br>same as above by dividing it into 5 parts of 5 PRBs |

FIG. 11 depicts an example interlacing structure design 1100 with PRB-level interlacing across multiple subchannels, according to embodiments of the disclosure. Here, is assumed that the LBT sub-band spans 100 PRBs (i.e., from PRB index #0 to PRB index #99) with SCS=15 kHz and the resource pool is divided into four subchannels of equal size (i.e., 25 PRBs). As depicted, the interlacing structure extends across multiple subchannels. In one embodiment, a first interlace (i.e., Interlace #0) comprises PRB indices: #0, #10, #20, #30, #40, #50, #60, #70, #80, and #90, while the second interlace (i.e., Interlace #1) comprises PRB indices: #1, #11, #21, #31, #41, #51, #61, #71, #81, and #91, and so forth. For the depicted example, N'=10 and M'=10.

FIG. 12 depicts an example interlacing structure design 1200 with PRB-level interlacing across multiple subchannels, according to embodiments of the disclosure. Here, is assumed that the LBT sub-band spans 100 PRBs (i.e., from PRB index #0 to PRB index #99) with SCS=15 kHz and the resource pool is divided into two subchannels of equal size (i.e., 50 PRBs). As depicted, the interlacing structure extends across multiple subchannels. In one embodiment, a first interlace (i.e., Interlace #0) comprises PRB indices: #0, #10, #20, #30, #40, #50, #60, #70, #80, and #90, while the second interlace (i.e., Interlace #1) comprises PRB indices: #1, #11, #21, #31, #41, #51, #61, #71, #81, and #91, and so forth. For the depicted example, N'=10 and M'=10.

Considering the above options for the sidelink unlicensed operation, an exemplary example of interlacing configuration for a resource pool configured with a 20 MHz bandwidth considering larger subchannel sizes from 50, 75, and 100 PRBs for sub-carrier spacing of 15 kHz is shown in the below Table 3.

TABLE 3

Sidelink Interlacing configuration for a resource
pool with 20 MHz BW (100 PRBs@15 KHz SCS)

| Subchannel size (PRBs) | Number of subchannels in a resource pool | Remaining PRBs | Interlacing structure examples considering 15 KHz SCS |
|---|---|---|---|
| 50 | 2 | 0 | Option 1:<br>M = 1, N = 2<br>Only one interlace<br>Option 2:<br>PRB/PRB group level interlacing configured across subchannel as shown in FIG. 12. Another example of the interlacing configuration is UE may start allocation with the lowest PRB/PRB group in each of the subchannel in a |

TABLE 3-continued

| Subchannel size (PRBs) | Number of subchannels in a resource pool | Remaining PRBs | Interlacing structure examples considering 15 KHz SCS |
|---|---|---|---|
| | | | Sidelink Interlacing configuration for a resource pool with 20 MHz BW (100 PRBs@15 KHz SCS) |
| | | | resource pool and after finishing all subchannel then the second lowest PRB/PRB group in each subchannel in a resource pool. Option 3: UE may start PRB/PRB group/subchannel allocation from both edge of the resource pool and then from the middle/center of the resource pool. |
| 75 | 1 | 25 | Option1: One subchannel with 25 empty PRBs in the middle/center, whereas the SC#0 is distributed as shown in FIG. 8. Option 2: Remaining 25 PRBs may be configured as a SC#1. SC#0: 75 PRBs (distributed) SC#1: 25 PRBs Option 3: PRB/PRB group level interlacing configured in a subchannel Option 4: UE may start PRB/PRB group/subchannel allocation from both edge of the resource pool and then from the middle/center of the resource pool. |
| 100 | 1 | 0 | Option 1: PRB/PRB group level interlacing configured in a subchannel Option 2: UE may start PRB/PRB group/subchannel allocation from both edge of the resource pool and then from the middle/center of the resource pool |

Considering the above options for the sidelink unlicensed operation, an exemplary example of interlacing structure for a resource pool configured with a 20 MHz bandwidth considering different subchannel sizes from 4, 5, 10, 12 for sub-carrier spacing of 30 kHz is shown in the below Table 4.

TABLE 4

| Subchannel size (PRBs) | Number of subchannels in a resource pool | Remaining PRBs | Interlacing structure examples considering 30 KHz SCS |
|---|---|---|---|
| | | | Sidelink Interlacing configuration for a resource pool with 20 MHz BW (50 PRBs@30 KHz SCS) |
| 4 | 12 | 2 | $M = 2, N = 6$ Interlace 0 SC #0, 2, 4, 6, 8, 10 Interlace 1 SC #1, 3, 5, 7, 9, 11 2 empty PRBs in the middle/center of the resource pool |
| 5 | 10 | 0 | $M = 2, N = 5$ Interlace 0 SC #0, 2, 4, 6, 8 Interlace 1 SC #1, 3, 5, 7, 9 |
| 10 | 5 | 0 | $M = 2, N = 3$ where the one remaining subchannel of 20 PRBs can be split into two subchannel of 10 PRBs each, with 6 subchannels with 4 SC having 20 RBs each and 2 SC having 10 RBs each |
| 12 | 4 | 2 | Option 1: $M = 1, N = 4$ Only one interlace 2 empty PRBs allocated in the middle/center of the resource pool Option 2: PRB/PRB group level interlacing configured across subchannel. Another example of the interlacing configuration is UE may start allocation with the lowest PRB/PRB group in each of the subchannel in a resource pool and after finishing all subchannel then the second lowest PRB/PRB group in each subchannel in a resource pool. |

TABLE 4-continued

| | | | |
|---|---|---|---|
| Sidelink Interlacing configuration for a resource pool with 20 MHz BW (50 PRBs@30 KHz SCS) | | | |
| Subchannel size (PRBs) | Number of subchannels in a resource pool | Remaining PRBs | Interlacing structure examples considering 30 KHz SCS |
| | | | Option 3: UE may start PRB/PRB group/subchannel allocation from both edge of the resource pool and then from the middle/center of the resource pool. |

Considering the above options for the sidelink unlicensed operation, an exemplary example of interlacing structure for a resource pool configured with a 20 MHz bandwidth considering different subchannel sizes from 15, 20 for sub-carrier spacing of 30 kHz is shown in the below Table 5.

TABLE 5

| | | | |
|---|---|---|---|
| Sidelink Interlacing configuration for a resource pool with 20 MHz BW (50 PRBs@30 KHz SCS) | | | |
| Subchannel size (PRBs) | Number of subchannels in a resource pool | Remaining PRBs | Interlacing structure examples considering 30 KHz SCS |
| 15 | 3 | 5 | Option 1: $M = 1$, $N = 3$ Only one interlace 5 empty PRBs allocated in the middle/center of the resource pool Option 2: PRB/PRB group level interlacing configured across subchannel. Another example of the interlacing configuration is UE may start allocation with the lowest PRB/PRB group in each of the subchannel in a resource pool and after finishing all subchannel then the second lowest PRB/PRB group in each subchannel in a resource pool. Option 3: UE may start PRB/PRB group/subchannel allocation from both edge of the resource pool and then from the middle/center of the resource pool. |
| 20 | 2 | 10 | Option 1: $M = 1$, $N = 2$ where the one remaining 10 PRBs can be left empty in the middle/center of the resource pool Option 2: $M = 1$, $N = 2$ where the one remaining 10 PRBs can be split into two subchannel of 5 PRBs each, as shown in FIG. 10. Option 2: PRB/PRB group level interlacing configured across subchannel. Another example of the interlacing configuration is UE may start allocation with the lowest PRB/PRB group in each of the subchannel in a resource pool and after finishing all subchannel then the second lowest PRB/PRB group in each subchannel in a resource pool. Option 3: UE may start PRB/PRB group/subchannel allocation from both edge of the resource pool and then from the middle/center of the resource pool. |

Considering the above options for the sidelink unlicensed operation, an exemplary example of interlacing structure for a resource pool configured with a 20 MHz bandwidth considering different subchannel sizes from 25, 50 for sub-carrier spacing of 30 kHz is shown in the below Table 6.

TABLE 6

Sidelink Interlacing configuration for a resource
pool with 20 MHz BW (50 PRBs@30 KHz SCS)

| Subchannel size (PRBs) | Number of subchannels in a resource pool | Interlacing structure examples considering 30 KHz SCS |
|---|---|---|
| 25 | 2 | Option 1:<br>M = 1, N = 2 containing one interlace configuration<br>Option 2:<br>PRB/PRB group level interlacing configured across subchannel. Another example of the interlacing configuration is UE may start allocation with the lowest PRB/PRB group in each of the subchannel in a resource pool and after finishing all subchannel then the second lowest PRB/PRB group in each subchannel in a resource pool.<br>Option 3:<br>UE may start PRB/PRB group/subchannel allocation from both edge of the resource pool and then from the middle/center of the resource pool. |
| 50 | 1 | Option 1:<br>PRB/PRB group level interlacing configured across subchannel. Another example of the interlacing configuration is UE may start allocation with the lowest PRB/PRB group in each of the subchannel in a resource pool and after finishing all subchannel then the second lowest PRB/PRB group in each subchannel in a resource pool.<br>Option 2:<br>UE may start PRB/PRB group/subchannel allocation from both edge of the resource pool and then from the middle/center of the resource pool. |

According to embodiments of: More than one resource pool configured to occupy the minimum occupied bandwidth (e.g., 20 MHz BW), interleaving is performed among frequency resources (e.g., subchannels, or PRBs, or PRB groups) in addition to the interlacing. In various embodiments, when more than one resource pool is configured to occupy the minimum occupied bandwidth (e.g., for 20 MHz) then the number of resource pool occupying the 20 MHz bandwidth may be interleaved, such that each interleaved resource pool occupies the entire LBT sub-band.

FIG. 13 depicts an example interlacing structure design 1300 with resource pool interleaving, e.g., at the subchannel level, is performed across a LBT sub-band, according to embodiments of the disclosure. In some embodiments, when more than one resource pool is configured to occupy the minimum occupied bandwidth then subchannels of a first resource pool are interleaved with subchannels of a second resource pool, such that each interleaved resource pool occupies the entire LBT sub-band. It is assumed that the LBT sub-band spans 20 MHz with SCS=15 kHz. As depicted, the interlacing structure comprises six (6) sub-channels of the first resource pool (denoted RP #0) inter-leaved with six (6) subchannels of the second resource pool (denoted RP #1).

In some embodiments, an interleaving parameter 1' could be configured such that L=0 means there is no interleaving configured and L=1 means two resource pool may be interleaved in the frequency domain, i.e., alternating between subchannel of first resource pool and subchannel of the second resource pool and so on as shown in the FIG. 13.

When more than one resource pool overlaps in the frequency domain and when these resource pool bandwidths are the same, then the same or similar subchannel size configurations may be applied for these overlapping resource pool. For example, within a 20 MHz of LBT sub-band when there are two configured resource pools with 20 MHz and 10 MHz each and there is a 10 MHz of frequency overlapping between them, then the sub-channel size configuration for these resource pool maybe configured as same/similar, i.e., 5 PRB of subchannel size.

In various embodiments of the second solution, subchannel-wise interlacing (e.g., as described above in the first solution) may be performed within each resource pool, in addition to the interleaving of the resource pools, such that the UE 205 occupies the minimum occupied bandwidth while performing transmission within the resource pool.

In some implementations of the second solution, resource pool interleaving may be performed even when resource pool bandwidth configuration and subchannel sizes of each resource pool are different. In such embodiments, the inter-leaving configuration may be chosen such that each of these resource pools satisfies the minimum occupied bandwidth requirement.

FIG. 14 depicts an example interlacing structure design 1400 with resource pool interleaving, e.g., at the subchannel level, is performed across a LBT sub-band, according to embodiments of the disclosure. Here, the interleaving parameter 'L' has a value L=1 such that subchannels of a first resource pool are interleaved with subchannels of a second resource pool, such that each interleaved resource pool occupies the entire LBT sub-band. It is assumed that the LBT sub-band spans 20 MHz with SCS=15 kHz. As depicted, the interlacing structure comprises six (6) subchannels of the first resource pool (denoted RP #0) interleaved with six (6) subchannels of the second resource pool (denoted RP #1). However, the first resource pool is configured with a larger subchannel size than the second resource pool.

FIG. 15 depicts an example interlacing structure design 1500 with resource pool interleaving, e.g., at the subchannel level, is performed across a LBT sub-band, according to embodiments of the disclosure. In the depicted embodiment, the first resource pool (denoted RP #0) is configured with a larger number of subchannels than the second resource pool (denoted RP #1). Accordingly, the interlacing structure comprises eight (8) subchannels of the first resource pool (denoted RP #0) interleaved with four (4) subchannels of the second resource pool (denoted RP #1), such that each interleaved resource pool occupies the entire LBT sub-band.

Because more than one resource pool may be configured to occupy the minimum occupied bandwidth (e.g., 20 MHz BW) and each of the resource pool might not contain multiple of configured subchannel size, then the remaining PRB from each of the resource pools occupying the minimum occupied bandwidth e.g., 20 MHz could be configured jointly or together. As an example, when remaining PRB is 5 PRB in the first resource pool and then 2 PRB in the second resource pool, then the remaining PRB could be configured jointly as 7 PRBs.

In one implementation, those remaining PRBs jointly configured from more than one resource pool could be configured as a separate resource pool when the remaining PRB size is more than the minimum subchannel size required to create a resource pool. In another implementation, those remaining PRBs jointly configured from more than one resource pool may be configured as empty PRBs and may be allocated in the middle/center of the bandwidth the remaining PRBs may be configured as a subchannel, e.g., of different subchannel size, and interleaved and spread across the resource pool.

FIG. 16 depicts an example interlacing structure design 1600 for spread subchannel based on interleaved PRBs (or PRB groups) within a resource pool, according to embodiments of the disclosure. It is assumed that the LBT sub-band spans 20 MHz with SCS=15 kHz. As depicted, the interlacing structure comprises ten groups of interleaved PRBs (i.e., from PRB Group index #0 to PRB Group index #9) formed into two subchannels. A first subchannel (denoted SC #0) is formed from the following PRB groups: #0, #2, #4, #6, and #8. A second subchannel (denoted SC #1) is formed from the following PRB groups: #1, #3, #5, #7, and #9.

FIG. 17 depicts an example interlacing structure design 1700 for spread subchannel based on interleaved PRBs (or PRB groups) within a resource pool, according to embodiments of the disclosure. It is assumed that the LBT sub-band spans 20 MHz with SCS=15 kHz. As depicted, the interlacing structure comprises 20 groups of interleaved PRBs (i.e., from PRB Group index #0 to PRB Group index #19) formed into four subchannels. A first subchannel (denoted SC #0) is formed from the following PRB groups: #0, #4, #8, #12, and #16. A second subchannel (denoted SC #1) is formed from the following PRB groups: #1, #5, #9, #13, and #17 A third subchannel (denoted SC #2) is formed from the following PRB groups: #2, #6, #10, #14, and #18. A fourth subchannel (denoted SC #3) is formed from the following PRB groups: #3, #7, #11, #15, and #19.

Considering the above option for the sidelink unlicensed operation, an exemplary example of interlacing structure for a resource pool configured with a 20 MHz bandwidth considering different subchannel sizes from 20, 25, 50, 75, 100 for sub-carrier spacing e.g., 15 kHz are shown in the below Table 7.

TABLE 7

| | Sidelink Interlacing configuration for interleaved resource pools spanning 20 MHz BW (100 PRBs@15 KHz SCS) | | |
|---|---|---|---|
| Subchannel size (PRBs) | Number of subchannels in a resource pool | Remaining PRBs | Interlacing structure examples considering 15 KHz SCS |
| 20 | 5 | 0 | Option 1: Interleave 20 SC into 2 PRB groups of 10 PRBs each Option 2: Interleave 20 SC into 4 PRB groups of 5 PRBs each |
| 25 | 4 | 0 | Interleave 25 SC into 5 PRB groups of 5 PRBs each |
| 50 | 2 | 0 | Interleave 25 SC into 5 PRB groups of 10 PRBs each |
| 75 | 1 | 25 | Interleave 75 SC into 5 PRB groups of 15 PRBs each |
| 100 | 1 | 0 | Interleave 100 SC into 10 PRB groups of 10 PRBs each | i.e., LBT sub-band and in one example, a parameter is introduced as part of the SL BWP (pre)configuration in RRC indicating the bitmap of the PRB/PRB group as the empty PRBs.

According to embodiments of the third solution, a subchannel may be determined based on interleaved PRBs/PRB groups within a resource pool, thereby a single subchannel could be spread across a resource pool. In some embodiments, the remaining PRB from each of the resource pools occupying the minimum occupied bandwidth e.g., 20 MHz could be configured jointly or together. In one implementation, when the amount of remaining PRBs is not large enough for a full subchannel, then these remaining PRBs become empty PRBs that may be configured towards the middle/center of a resource pool. In another implementation, In some embodiments, X bits of the PUSCH frequency domain resource allocation field may be used for indicating which combination of M interlaces is allocated to the UE. In one embodiment, the UE receives a bitmap to indicate all possible interlace combinations (e.g., a 10-bit bitmap to indicate one of 10 possible interlace combinations). In another embodiment, the X bits indicate a start interlace index and a number of contiguous interlace indices (e.g., combined into a single value called Resource Indicator Value ("RIV")) and using remaining RIV values to indicate specific pre-defined interlace combinations.

Figure 18:
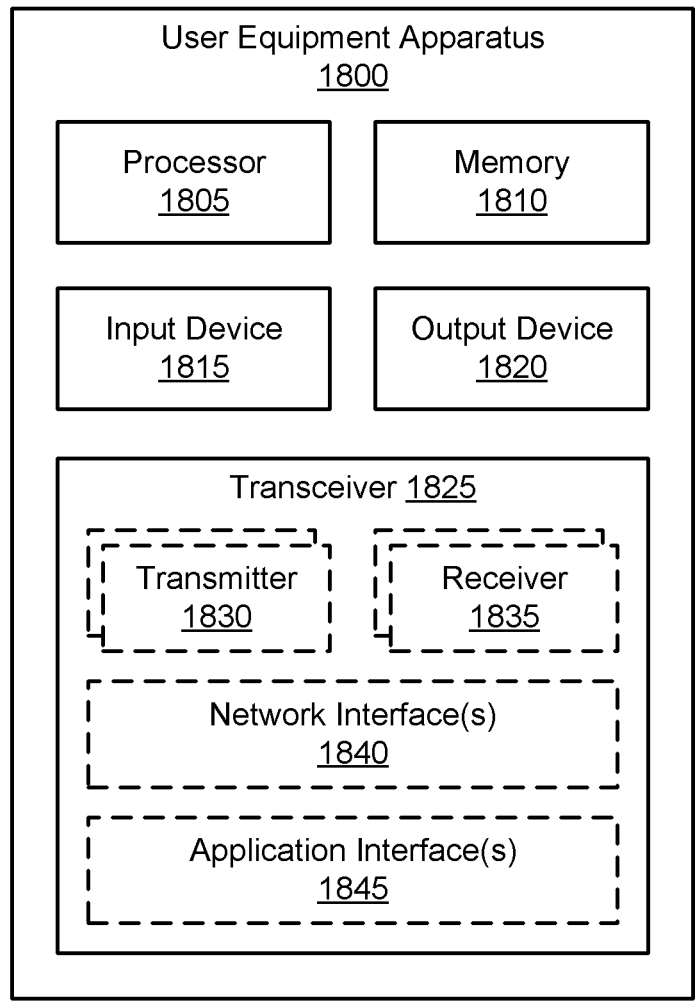
FIG. 18 is a block diagram illustrating one embodiment of a user equipment apparatus that may be used for interlacing sidelink resources.

FIG. 18 depicts a user equipment apparatus 1800 that may be used for interlacing sidelink resources, according to embodiments of the disclosure. In various embodiments, the user equipment apparatus 1800 is used to implement one or more of the solutions described above. The user equipment apparatus 1800 may be one embodiment of the remote unit 105 and/or the UE 205, described above. Furthermore, the user equipment apparatus 1800 may include a processor 1805, a memory 1810, an input device 1815, an output device 1820, and a transceiver 1825.

In some embodiments, the input device 1815 and the output device 1820 are combined into a single device, such as a touchscreen. In certain embodiments, the user equipment apparatus 1800 may not include any input device 1815 and/or output device 1820. In various embodiments, the user equipment apparatus 1800 may include one or more of: the processor 1805, the memory 1810, and the transceiver 1825, and may not include the input device 1815 and/or the output device 1820.

As depicted, the transceiver 1825 includes at least one transmitter 1830 and at least one receiver 1835. In some embodiments, the transceiver 1825 communicates with one or more cells (or wireless coverage areas) supported by one or more base units 121. In various embodiments, the transceiver 1825 is operable on unlicensed spectrum. Moreover, the transceiver 1825 may include multiple UE panels supporting one or more beams. Additionally, the transceiver 1825 may support at least one network interface 1840 and/or application interface(s) 1845. The application interface(s) 1845 may support one or more APIs. The network interface(s) 1840 may support 3GPP reference points, such as Uu, N1, PC5, etc. Other network interfaces 1840 may be supported, as understood by one of ordinary skill in the art.

The processor 1805, in one embodiment, may include any known controller capable of executing computer-readable instructions and/or capable of performing logical operations. For example, the processor 1805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1805 executes instructions stored in the memory 1810 to perform the methods and routines described herein. The processor 1805 is communicatively coupled to the memory 1810, the input device 1815, the output device 1820, and the transceiver 1825.

In various embodiments, the processor 1805 controls the user equipment apparatus 1800 to implement the above described UE behaviors. In certain embodiments, the processor 1805 may include an application processor (also known as "main processor") which manages application-domain and operating system ("OS") functions and a baseband processor (also known as "baseband radio processor") which manages radio functions.

In various embodiments, the processor 1805 controls the transceiver 1825 to receive a resource pool configuration (e.g., from network or receiving a pre-configuration of the resource pool) and to receive an interlacing configuration corresponding to the resource pool configuration. Here, the resource pool configuration indicates a subchannel size and resource pool time-frequency configuration (e.g., bitmap of time slot and frequency resources) for an unlicensed sidelink carrier. Moreover, the interlacing configuration indicates at least: a) a number of subcarriers (or PRBs) per interlace (N) based on the subchannel size, b) a spacing between the interlace (M) based on the subchannel size, c) a minimum amount of resource (e.g., subchannel and/or PRB) to be used for transmission in a resource pool, and d) indicating the type/method of interlacing to be performed. Via the transceiver 1825, the processor 1805 transmits a sidelink channel according to the interlacing configuration within the unlicensed sidelink carrier, the sidelink channel comprising at least one of: a sidelink data channel and a sidelink control channel.

In some embodiments, a resource pool size is not a multiple of the subchannel size. In such embodiments, the interlacing configuration further indicates a bitmap of remaining Physical Resource Blocks ("PRBs"). In one embodiment, the remaining PRBs are configured as empty PRBs in the middle (i.e., center) of the resource pool. In another embodiment, the remaining PRBs are allocated to at least one subcarrier having a second subchannel size different than the subchannel size indicated in the resource pool configuration.

In some embodiments, the processor 1805 determines a PRB-level interlacing scheme within each subchannel. In certain embodiments, the PRB-level interlacing scheme extends across multiple subchannels. In certain embodiments, the PRB-level interlacing scheme is a first PRB-level interlacing scheme having allocations starting from a lowest PRB in each subchannel belonging to an interlacing structure in a resource pool. In such embodiments, the interlacing configuration may further indicate a second PRB-level interlacing scheme has allocations starting from a second lowest PRB in each subchannel belonging to an interlacing structure in a resource pool.

In some embodiments, the interlacing configuration further indicates an interlacing scheme having allocations starting from both ends (i.e., edges) of the resource pool, the allocations continuing towards the middle (i.e., center) of the resource pool. In certain embodiments, the interlacing scheme comprises at least one of PRB-level interlacing and subchannel-level interlacing. In some embodiments, each subchannel comprises interleaved PRBs (or PRB groups) within the resource pool.

In some embodiments, the interlacing configuration comprises multiple subchannel sizes and a bitmap of subchannel indices for each subchannel size. In some embodiments, the resource pool corresponds to a LBT subband. In some embodiments, the interlacing configuration comprises an interleaving scheme for multiple resource pools that occupy a LBT subband. In certain embodiments, a first resource pool of the multiple resource pools has a different subcarrier size than a second resource pool. In certain embodiments, a first resource pool of the multiple resource pools has a different number of subcarriers (e.g., a different resource pool size) than a second resource pool.

The memory 1810, in one embodiment, is a computer readable storage medium. In some embodiments, the memory 1810 includes volatile computer storage media. For example, the memory 1810 may include a RAM, including dynamic RAM ("DRAM"), synchronous dynamic RAM ("SDRAM"), and/or static RAM ("SRAM"). In some embodiments, the memory 1810 includes non-volatile computer storage media. For example, the memory 1810 may include a hard disk drive, a flash memory, or any other suitable non-volatile computer storage device. In some embodiments, the memory 1810 includes both volatile and non-volatile computer storage media.

In some embodiments, the memory 1810 stores data related to interlacing sidelink resources and/or mobile operation. For example, the memory 1810 may store various parameters, panel/beam configurations, resource assignments, policies, and the like as described above. In certain embodiments, the memory 1810 also stores program code and related data, such as an operating system or other controller algorithms operating on the apparatus 1800.

The input device 1815, in one embodiment, may include any known computer input device including a touch panel, a button, a keyboard, a stylus, a microphone, or the like. In some embodiments, the input device 1815 may be integrated with the output device 1820, for example, as a touchscreen or similar touch-sensitive display. In some embodiments, the input device 1815 includes a touchscreen such that text may be input using a virtual keyboard displayed on the touchscreen and/or by handwriting on the touchscreen. In some embodiments, the input device 1815 includes two or more different devices, such as a keyboard and a touch panel.

The output device 1820, in one embodiment, is designed to output visual, audible, and/or haptic signals. In some embodiments, the output device 1820 includes an electronically controllable display or display device capable of outputting visual data to a user. For example, the output device 1820 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 1820 may include a wearable display separate from, but communicatively coupled to, the rest of the user equipment apparatus 1800, such as a smart watch, smart glasses, a heads-up display, or the like. Further, the output device 1820 may be a component of a smart phone, a personal digital assistant, a television, a table computer, a notebook (laptop) computer, a personal computer, a vehicle dashboard, or the like.

In certain embodiments, the output device 1820 includes one or more speakers for producing sound. For example, the output device 1820 may produce an audible alert or notification (e.g., a beep or chime). In some embodiments, the output device 1820 includes one or more haptic devices for producing vibrations, motion, or other haptic feedback. In some embodiments, all or portions of the output device 1820 may be integrated with the input device 1815. For example, the input device 1815 and output device 1820 may form a touchscreen or similar touch-sensitive display. In other embodiments, the output device 1820 may be located near the input device 1815.

The transceiver 1825 communicates with one or more network functions of a mobile communication network via one or more access networks. The transceiver 1825 operates under the control of the processor 1805 to transmit messages, data, and other signals and also to receive messages, data, and other signals. For example, the processor 1805 may selectively activate the transceiver 1825 (or portions thereof) at particular times in order to send and receive messages.

The transceiver 1825 includes at least transmitter 1830 and at least one receiver 1835. One or more transmitters 1830 may be used to provide UL communication signals to a base unit 121, such as the UL transmissions described herein. Similarly, one or more receivers 1835 may be used to receive DL communication signals from the base unit 121, as described herein. Although only one transmitter 1830 and one receiver 1835 are illustrated, the user equipment apparatus 1800 may have any suitable number of transmitters 1830 and receivers 1835. Further, the transmitter(s) 1830 and the receiver(s) 1835 may be any suitable type of transmitters and receivers. In one embodiment, the transceiver 1825 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1825, transmitters 1830, and receivers 1835 may be implemented as physically separate components that access a shared hardware resource and/or software resource, such as for example, the network interface 1840.

In various embodiments, one or more transmitters 1830 and/or one or more receivers 1835 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 1830 and/or one or more receivers 1835 may be implemented and/or integrated into a multi-chip module. In some embodiments, other components such as the network interface 1840 or other hardware components/circuits may be integrated with any number of transmitters 1830 and/or receivers 1835 into a single chip. In such embodiment, the transmitters 1830 and receivers 1835 may be logically configured as a transceiver 1825 that uses one more common control signals or as modular transmitters 1830 and receivers 1835 implemented in the same hardware chip or in a multi-chip module.

Figure 19:
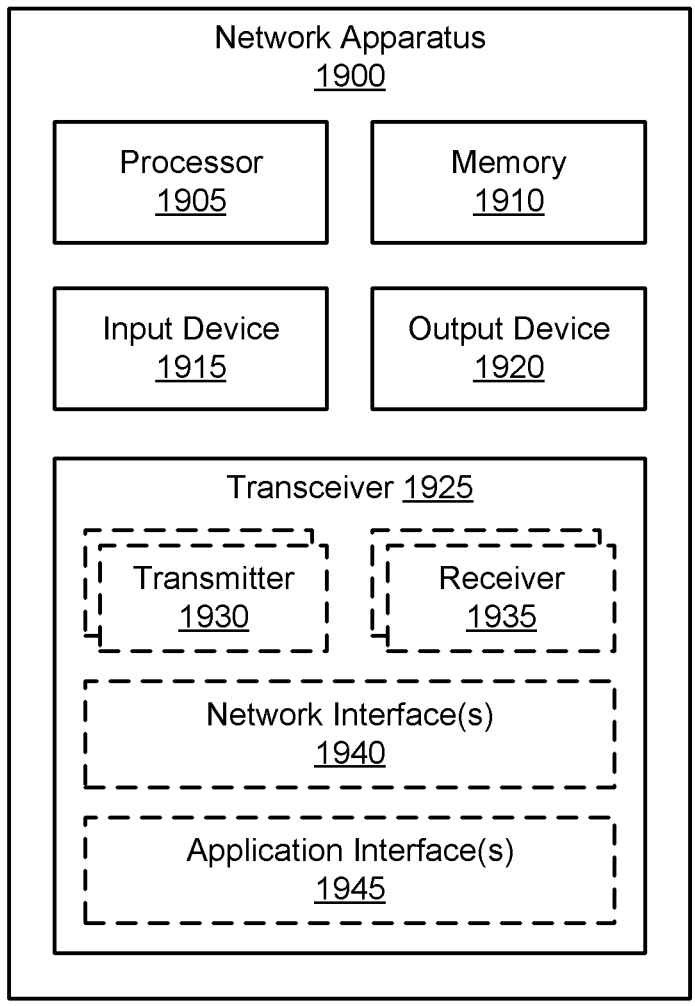
FIG. 19 is a block diagram illustrating one embodiment of a network apparatus that may be used for interlacing sidelink resources.

FIG. 19 depicts a network apparatus 1900 that may be used for interlacing sidelink resources, according to embodiments of the disclosure. In one embodiment, network apparatus 1900 may be one implementation of a RAN entity, such as the base unit 121 and/or the RAN node 210, as described above. Furthermore, the network apparatus 1900 may include a processor 1905, a memory 1910, an input device 1915, an output device 1920, and a transceiver 1925.

In some embodiments, the input device 1915 and the output device 1920 are combined into a single device, such as a touchscreen. In certain embodiments, the network apparatus 1900 may not include any input device 1915 and/or output device 1920. In various embodiments, the network apparatus 1900 may include one or more of: the processor 1905, the memory 1910, and the transceiver 1925, and may not include the input device 1915 and/or the output device 1920.

As depicted, the transceiver 1925 includes at least one transmitter 1930 and at least one receiver 1935. Here, the transceiver 1925 communicates with one or more remote units 105. Additionally, the transceiver 1925 may support at least one network interface 1940 and/or application interface 1945. The application interface(s) 1945 may support one or more APIs. The network interface(s) 1940 may support 3GPP reference points, such as Uu, N1, N2 and N3. Other network interfaces 1940 may be supported, as understood by one of ordinary skill in the art.

The processor 1905, in one embodiment, may include any known controller capable of executing computer-readable instructions and/or capable of performing logical operations. For example, the processor 1905 may be a microcontroller, a microprocessor, a CPU, a GPU, an auxiliary processing unit, a FPGA, or similar programmable controller. In some embodiments, the processor 1905 executes instructions stored in the memory 1910 to perform the methods and routines described herein. The processor 1905 is communicatively coupled to the memory 1910, the input device 1915, the output device 1920, and the transceiver 1925.

In various embodiments, the network apparatus 1900 is a RAN node (e.g., gNB) that communicates with one or more UEs, as described herein. In such embodiments, the processor 1905 controls the network apparatus 1900 to perform the above described RAN behaviors. When operating as a RAN node, the processor 1905 may include an application processor (also known as "main processor") which manages application-domain and operating system ("OS") functions and a baseband processor (also known as "baseband radio processor") which manages radio functions.

In various embodiments, the processor 1905 controls the apparatus 1900 to configure an interlacing scheme for unlicensed sidelink operation. In some embodiments, the transceiver 1925 transmits (e.g., via an air/radio interface) a resource pool configuration to a UE, where the resource pool configuration indicates a subchannel size and resource pool time-frequency configuration (e.g., bitmap of time slot and frequency resources) for an unlicensed sidelink carrier. The transceiver 1925 also transmits an interlacing configuration corresponding to the resource pool configuration to the UE, where the interlacing configuration indicates: a) a number of subcarriers (or PRBs) per interlace (N) based on the subchannel size, b) a spacing between the interlace (M) based on the subchannel size, c) a minimum amount of resource (e.g., subchannel and/or PRB) to be used for transmission in a resource pool, and d) the type/method of interlacing to be performed.

In some embodiments, a resource pool size is not a multiple of the subchannel size. In such embodiments, the interlacing configuration further indicates a bitmap of remaining Physical Resource Blocks ("PRBs"). In one embodiment, the remaining PRBs are configured as empty PRBs in the middle (i.e., center) of the resource pool. In another embodiment, the remaining PRBs are allocated to at least one subcarrier having a second subchannel size different than the subchannel size indicated in the resource pool configuration.

In some embodiments, the interlacing configuration further indicates a PRB-level interlacing scheme within each subchannel. In certain embodiments, the PRB-level interlacing scheme extends across multiple subchannels. In certain embodiments, the PRB-level interlacing scheme is a first PRB-level interlacing scheme having allocations starting from a lowest PRB in each subchannel belonging to an interlacing structure in a resource pool. In such embodiments, the interlacing configuration may further indicate a second PRB-level interlacing scheme has allocations starting from a second lowest PRB in each subchannel belonging to an interlacing structure in a resource pool.

In some embodiments, the interlacing configuration further indicates an interlacing scheme having allocations starting from both ends (i.e., edges) of the resource pool, the allocations continuing towards the middle (i.e., center) of the resource pool. In certain embodiments, the interlacing scheme comprises at least one of PRB-level interlacing and subchannel-level interlacing. In some embodiments, each subchannel comprises interleaved PRBs (or PRB groups) within the resource pool.

In some embodiments, the interlacing configuration comprises multiple subchannel sizes and a bitmap of subchannel indices for each subchannel size. In some embodiments, the resource pool corresponds to a LBT subband. In some embodiments, the interlacing configuration comprises an interleaving scheme for multiple resource pools that occupy a LBT subband. In certain embodiments, a first resource pool of the multiple resource pools has a different subcarrier size than a second resource pool. In certain embodiments, a first resource pool of the multiple resource pools has a different number of subcarriers (e.g., a different resource pool size) than a second resource pool.

The memory 1910, in one embodiment, is a computer readable storage medium. In some embodiments, the memory 1910 includes volatile computer storage media. For example, the memory 1910 may include a RAM, including dynamic RAM ("DRAM"), synchronous dynamic RAM ("SDRAM"), and/or static RAM ("SRAM"). In some embodiments, the memory 1910 includes non-volatile computer storage media. For example, the memory 1910 may include a hard disk drive, a flash memory, or any other suitable non-volatile computer storage device. In some embodiments, the memory 1910 includes both volatile and non-volatile computer storage media.

In some embodiments, the memory 1910 stores data related to interlacing sidelink resources and/or mobile operation. For example, the memory 1910 may store parameters, configurations, resource assignments, policies, and the like, as described above. In certain embodiments, the memory 1910 also stores program code and related data, such as an operating system or other controller algorithms operating on the apparatus 1900.

The input device 1915, in one embodiment, may include any known computer input device including a touch panel, a button, a keyboard, a stylus, a microphone, or the like. In some embodiments, the input device 1915 may be integrated with the output device 1920, for example, as a touchscreen or similar touch-sensitive display. In some embodiments, the input device 1915 includes a touchscreen such that text may be input using a virtual keyboard displayed on the touchscreen and/or by handwriting on the touchscreen. In some embodiments, the input device 1915 includes two or more different devices, such as a keyboard and a touch panel.

The output device 1920, in one embodiment, is designed to output visual, audible, and/or haptic signals. In some embodiments, the output device 1920 includes an electronically controllable display or display device capable of outputting visual data to a user. For example, the output device 1920 may include, but is not limited to, an LCD display, an LED display, an OLED display, a projector, or similar display device capable of outputting images, text, or the like to a user. As another, non-limiting, example, the output device 1920 may include a wearable display separate from, but communicatively coupled to, the rest of the network apparatus 1900, such as a smart watch, smart glasses, a heads-up display, or the like. Further, the output device 1920 may be a component of a smart phone, a personal digital assistant, a television, a table computer, a notebook (laptop) computer, a personal computer, a vehicle dashboard, or the like.

In certain embodiments, the output device 1920 includes one or more speakers for producing sound. For example, the output device 1920 may produce an audible alert or notification (e.g., a beep or chime). In some embodiments, the output device 1920 includes one or more haptic devices for producing vibrations, motion, or other haptic feedback. In some embodiments, all or portions of the output device 1920 may be integrated with the input device 1915. For example, the input device 1915 and output device 1920 may form a touchscreen or similar touch-sensitive display. In other embodiments, the output device 1920 may be located near the input device 1915.

The transceiver 1925 includes at least transmitter 1930 and at least one receiver 1935. One or more transmitters 1930 may be used to communicate with the UE, as described herein. Similarly, one or more receivers 1935 may be used to communicate with network functions in the PLMN and/or RAN, as described herein. Although only one transmitter 1930 and one receiver 1935 are illustrated, the network apparatus 1900 may have any suitable number of transmitters 1930 and receivers 1935. Further, the transmitter(s) 1930 and the receiver(s) 1935 may be any suitable type of transmitters and receivers.

FIG. 20 depicts one embodiment of a method 2000 for interlacing sidelink resources, according to embodiments of the disclosure. In various embodiments, the method 2000 is performed by a UE device, such as the remote unit 105, the UE 205, and/or the user equipment apparatus 1800, described above as described above. In some embodiments, the method 2000 is performed by a processor, such as a microcontroller, a microprocessor, a CPU, a GPU, an auxiliary processing unit, a FPGA, or the like.

The method 2000 begins and receives 2005 a resource pool configuration (e.g., from network or receiving a pre-configuration of the resource pool, where the resource pool configuration indicates a subchannel size and resource pool time-frequency configuration (e.g., bitmap of time slot and frequency resources) for an unlicensed sidelink carrier. The method 2000 includes receiving 2010 an interlacing configuration corresponding to the resource pool configuration, where the interlacing configuration indicates: a) a number of subcarriers (or PRBs) per interlace (N) based on the subchannel size, b) a spacing between the interlace (M) based on the subchannel size, c) a minimum amount of resource (e.g., subchannel and/or PRB) to be used for transmission in a resource pool, and d) indicating the type/method of interlacing to be performed. The method 2000 includes transmitting 2015 a sidelink channel according to the interlacing configuration within the unlicensed sidelink carrier, the sidelink channel comprising at least one of: a sidelink data channel and a sidelink control channel. The method 2000 ends.

Figure 21:
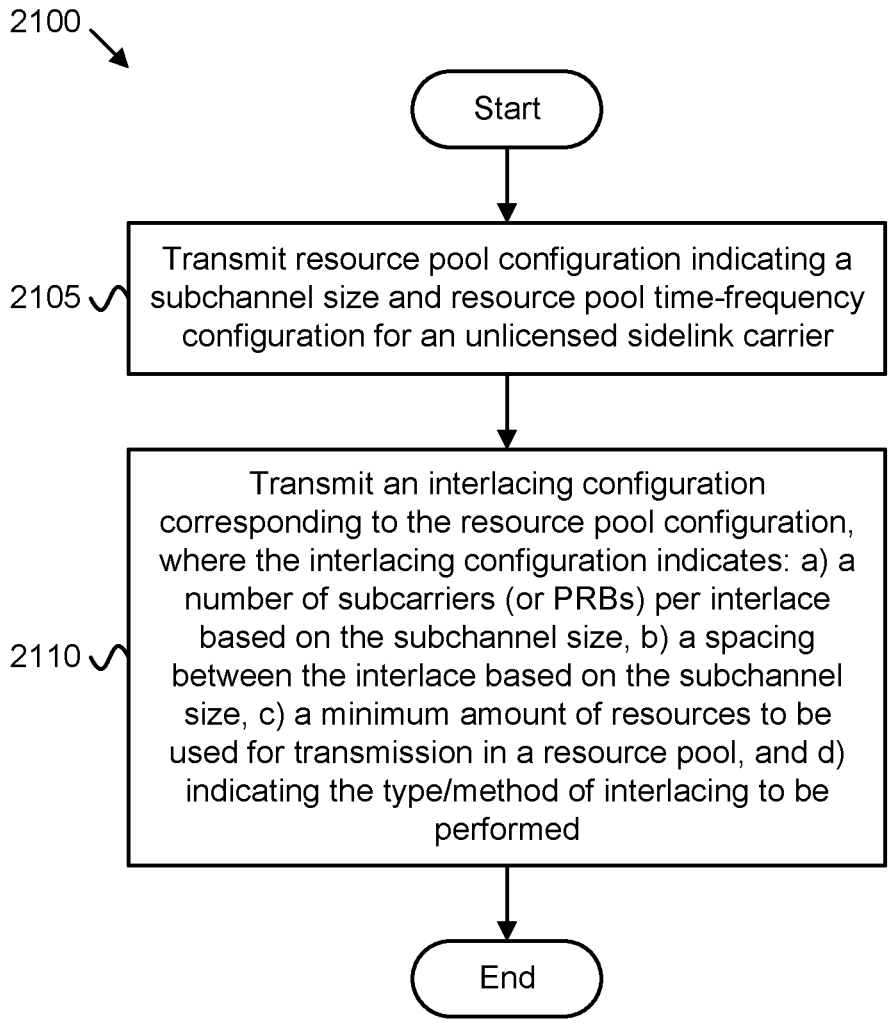
FIG. 21 is a flowchart diagram illustrating one embodiment of a second method for interlacing sidelink resources.

FIG. 21 depicts one embodiment of a method 2100 for interlacing sidelink resources, according to embodiments of the disclosure. In various embodiments, the method 2100 is performed by a network entity in a mobile communication network, such as the base unit 121, the RAN node 210, and/or the network apparatus 1900, described above as described above. In some embodiments, the method 2100 is performed by a processor, such as a microcontroller, a microprocessor, a CPU, a GPU, an auxiliary processing unit, a FPGA, or the like.

The method 2100 begins and transmits 2105 a resource pool configuration to a UE, where the resource pool configuration indicates a subchannel size and resource pool time-frequency configuration (e.g., bitmap of time slot and frequency resources) for an unlicensed sidelink carrier. The method 2100 includes transmitting 2110 an interlacing configuration corresponding to the resource pool configuration to the UE, where the interlacing configuration indicates: a) a number of subcarriers (or PRBs) per interlace (N) based on the subchannel size, b) a spacing between the interlace (M) based on the subchannel size, c) a minimum amount of resource (e.g., subchannel and/or PRB) to be used for transmission in a resource pool, and d) indicating the type/method of interlacing to be performed. The method 2100 ends.

Disclosed herein is a first apparatus for interlacing sidelink resources, according to embodiments of the disclosure.

The first apparatus may be implemented by a UE device, such as the remote unit 105, the UE 205, and/or the user equipment apparatus 1800, described above. The first apparatus includes a transceiver and a processor that receives a resource pool configuration (e.g., from network or receiving a pre-configuration of the resource pool) and receives an interlacing configuration corresponding to the resource pool configuration. Here, the resource pool configuration indicates a subchannel size and resource pool time-frequency configuration (e.g., bitmap of time slot and frequency resources) for an unlicensed sidelink carrier. Moreover, the interlacing configuration indicates at least: a) a number of subcarriers (or PRBs) per interlace (N) based on the subchannel size, b) a spacing between the interlace (M) based on the subchannel size, c) a minimum amount of resource (e.g., subchannel and/or PRB) to be used for transmission in a resource pool, and d) indicating the type/method of interlacing to be performed. The transceiver transmits a sidelink channel according to the interlacing configuration within the unlicensed sidelink carrier, the sidelink channel comprising at least one of: a sidelink data channel and a sidelink control channel.

In some embodiments, a resource pool size is not a multiple of the subchannel size. In such embodiments, the interlacing configuration further indicates a bitmap of remaining Physical Resource Blocks ("PRBs"). In one embodiment, the remaining PRBs are configured as empty PRBs in the middle (i.e., center) of the resource pool. In another embodiment, the remaining PRBs are allocated to at least one subcarrier having a second subchannel size different than the subchannel size indicated in the resource pool configuration.

In some embodiments, the processor determines a PRB-level interlacing scheme within each subchannel. In certain embodiments, the PRB-level interlacing scheme extends across multiple subchannels. In certain embodiments, the PRB-level interlacing scheme is a first PRB-level interlacing scheme having allocations starting from a lowest PRB in each subchannel belonging to an interlacing structure in a resource pool. In such embodiments, the interlacing configuration may further indicate a second PRB-level interlacing scheme has allocations starting from a second lowest PRB in each subchannel belonging to an interlacing structure in a resource pool.

In some embodiments, the interlacing configuration further indicates an interlacing scheme having allocations starting from both ends (i.e., edges) of the resource pool, the allocations continuing towards the middle (i.e., center) of the resource pool. In certain embodiments, the interlacing scheme comprises at least one of PRB-level interlacing and subchannel-level interlacing. In some embodiments, each subchannel comprises interleaved PRBs (or PRB groups) within the resource pool.

In some embodiments, the interlacing configuration comprises multiple subchannel sizes and a bitmap of subchannel indices for each subchannel size. In some embodiments, the resource pool corresponds to a LBT subband. In some embodiments, the interlacing configuration comprises an interleaving scheme for multiple resource pools that occupy a LBT subband. In certain embodiments, a first resource pool of the multiple resource pools has a different subcarrier size than a second resource pool. In certain embodiments, a first resource pool of the multiple resource pools has a different number of subcarriers (e.g., a different resource pool size) than a second resource pool.

Disclosed herein is a first method for interlacing sidelink resources, according to embodiments of the disclosure. The first method may be performed by a UE device, such as the remote unit 105, the UE 205, and/or the user equipment apparatus 1800, described above. The first method includes receiving a resource pool configuration (e.g., from network or receiving a pre-configuration of the resource pool and receiving an interlacing configuration corresponding to the resource pool configuration. Here, the resource pool configuration indicates a subchannel size and resource pool time-frequency configuration (e.g., bitmap of time slot and frequency resources) for an unlicensed sidelink carrier. Additionally, the interlacing configuration indicates: a) a number of subcarriers (or PRBs) per interlace (N) based on the subchannel size, b) a spacing between the interlace (M) based on the subchannel size, c) a minimum amount of resource (e.g., subchannel and/or PRB) to be used for transmission in a resource pool, and d) indicating the type/method of interlacing to be performed. The first method includes transmitting a sidelink channel according to the interlacing configuration within the unlicensed sidelink carrier, the sidelink channel comprising at least one of: a sidelink data channel and a sidelink control channel.

In some embodiments, a resource pool size is not a multiple of the subchannel size. In such embodiments, the interlacing configuration further indicates a bitmap of remaining Physical Resource Blocks ("PRBs"). In one embodiment, the remaining PRBs are configured as empty PRBs in the middle (i.e., center) of the resource pool. In another embodiment, the remaining PRBs are allocated to at least one subcarrier having a second subchannel size different than the subchannel size indicated in the resource pool configuration.

In some embodiments, the first method includes determining a PRB-level interlacing scheme within each subchannel. In certain embodiments, the PRB-level interlacing scheme extends across multiple subchannels. In certain embodiments, the PRB-level interlacing scheme is a first PRB-level interlacing scheme having allocations starting from a lowest PRB in each subchannel belonging to an interlacing structure in a resource pool. In such embodiments, the interlacing configuration may further indicate a second PRB-level interlacing scheme has allocations starting from a second lowest PRB in each subchannel belonging to an interlacing structure in a resource pool.

In some embodiments, the interlacing configuration further indicates an interlacing scheme having allocations starting from both ends (i.e., edges) of the resource pool, the allocations continuing towards the middle (i.e., center) of the resource pool. In certain embodiments, the interlacing scheme comprises at least one of PRB-level interlacing and subchannel-level interlacing. In some embodiments, each subchannel comprises interleaved PRBs (or PRB groups) within the resource pool.

In some embodiments, the interlacing configuration comprises multiple subchannel sizes and a bitmap of subchannel indices for each subchannel size. In some embodiments, the resource pool corresponds to a LBT subband. In some embodiments, the interlacing configuration comprises an interleaving scheme for multiple resource pools that occupy a LBT subband. In certain embodiments, a first resource pool of the multiple resource pools has a different subcarrier size than a second resource pool. In certain embodiments, a first resource pool of the multiple resource pools has a different number of subcarriers (e.g., a different resource pool size) than a second resource pool.

Disclosed herein is a first apparatus for interlacing sidelink resources, according to embodiments of the disclosure. The first apparatus may be implemented by a network entity in a mobile communication network, such as the base unit 121, the RAN node 210, and/or the network apparatus 1900, described above. The first apparatus includes a processor and a transceiver that transmits a resource pool configuration to a UE, where the resource pool configuration indicates a subchannel size and resource pool time-frequency configuration (e.g., bitmap of time slot and frequency resources) for an unlicensed sidelink carrier. The transceiver also transmits an interlacing configuration corresponding to the resource pool configuration to the UE, where the interlacing configuration indicates: a) a number of subcarriers (or PRBs) per interlace (N) based on the subchannel size, b) a spacing between the interlace (M) based on the subchannel size, c) a minimum amount of resource (e.g., subchannel and/or PRB) to be used for transmission in a resource pool, and d) the type/method of interlacing to be performed.

In some embodiments, a resource pool size is not a multiple of the subchannel size. In such embodiments, the interlacing configuration further indicates a bitmap of remaining Physical Resource Blocks ("PRBs"). In one embodiment, the remaining PRBs are configured as empty PRBs in the middle (i.e., center) of the resource pool. In another embodiment, the remaining PRBs are allocated to at least one subcarrier having a second subchannel size different than the subchannel size indicated in the resource pool configuration.

In some embodiments, the interlacing configuration further indicates a PRB-level interlacing scheme within each subchannel. In certain embodiments, the PRB-level interlacing scheme extends across multiple subchannels. In certain embodiments, the PRB-level interlacing scheme is a first PRB-level interlacing scheme having allocations starting from a lowest PRB in each subchannel belonging to an interlacing structure in a resource pool. In such embodiments, the interlacing configuration may further indicate a second PRB-level interlacing scheme has allocations starting from a second lowest PRB in each subchannel belonging to an interlacing structure in a resource pool.

In some embodiments, the interlacing configuration further indicates an interlacing scheme having allocations starting from both ends (i.e., edges) of the resource pool, the allocations continuing towards the middle (i.e., center) of the resource pool. In certain embodiments, the interlacing scheme comprises at least one of PRB-level interlacing and subchannel-level interlacing. In some embodiments, each subchannel comprises interleaved PRBs (or PRB groups) within the resource pool.

In some embodiments, the interlacing configuration comprises multiple subchannel sizes and a bitmap of subchannel indices for each subchannel size. In some embodiments, the resource pool corresponds to a LBT subband. In some embodiments, the interlacing configuration comprises an interleaving scheme for multiple resource pools that occupy a LBT subband. In certain embodiments, a first resource pool of the multiple resource pools has a different subcarrier size than a second resource pool. In certain embodiments, a first resource pool of the multiple resource pools has a different number of subcarriers (e.g., a different resource pool size) than a second resource pool.

Disclosed herein is a second method for interlacing sidelink resources, according to embodiments of the disclosure. The second method may be performed by a network entity in a mobile communication network, such as the base unit 121, the RAN node 210, and/or the network apparatus 1900, described above. The second method includes transmitting a resource pool configuration to a UE, where the resource pool configuration indicates a subchannel size and resource pool time-frequency configuration (e.g., bitmap of time slot and frequency resources) for an unlicensed sidelink carrier. The second method also includes transmitting an interlacing configuration corresponding to the resource pool configuration to the UE, where the interlacing configuration indicates: a) a number of subcarriers (or PRBs) per interlace (N) based on the subchannel size, b) a spacing between the interlace (M) based on the subchannel size, c) a minimum amount of resource (e.g., subchannel and/or PRB) to be used for transmission in a resource pool, and d) indicating the type/method of interlacing to be performed.

In some embodiments, a resource pool size is not a multiple of the subchannel size. In such embodiments, the interlacing configuration further indicates a bitmap of remaining Physical Resource Blocks ("PRBs"). In one embodiment, the remaining PRBs are configured as empty PRBs in the middle (i.e., center) of the resource pool. In another embodiment, the remaining PRBs are allocated to at least one subcarrier having a second subchannel size different than the subchannel size indicated in the resource pool configuration.

In some embodiments, the interlacing configuration further indicates a PRB-level interlacing scheme within each subchannel. In certain embodiments, the PRB-level interlacing scheme extends across multiple subchannels. In certain embodiments, the PRB-level interlacing scheme is a first PRB-level interlacing scheme having allocations starting from a lowest PRB in each subchannel belonging to an interlacing structure in a resource pool. In such embodiments, the interlacing configuration may further indicate a second PRB-level interlacing scheme has allocations starting from a second lowest PRB in each subchannel belonging to an interlacing structure in a resource pool.

In some embodiments, the interlacing configuration further indicates an interlacing scheme having allocations starting from both ends (i.e., edges) of the resource pool, the allocations continuing towards the middle (i.e., center) of the resource pool. In certain embodiments, the interlacing scheme comprises at least one of PRB-level interlacing and subchannel-level interlacing. In some embodiments, each subchannel comprises interleaved PRBs (or PRB groups) within the resource pool.

In some embodiments, the interlacing configuration comprises multiple subchannel sizes and a bitmap of subchannel indices for each subchannel size. In some embodiments, the resource pool corresponds to a LBT subband. In some embodiments, the interlacing configuration comprises an interleaving scheme for multiple resource pools that occupy a LBT subband. In certain embodiments, a first resource pool of the multiple resource pools has a different subcarrier size than a second resource pool. In certain embodiments, a first resource pool of the multiple resource pools has a different number of subcarriers (e.g., a different resource pool size) than a second resource pool.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A User Equipment ("UE") for wireless communication, comprising:
at least one memory; and
at least one processor coupled with the at least one memory and configured to cause the UE to:

receive a resource pool configuration for sidelink, wherein the resource pool configuration indicates a resource pool comprising a plurality of physical resource blocks ("PRBs") corresponding to a Listen-Before-Talk ("LBT") subband, each PRB comprising a set of subcarriers;

receive an interlacing configuration associated with the resource pool configuration, wherein the interlacing configuration indicates a set of subchannels within the resource pool and a number of interlaces for each subchannel of the set of subchannels, and wherein the number of interlaces is based at least in part on a subcarrier spacing of the resource pool;

determine an interlacing scheme based at least in part on the interlacing configuration and the resource pool, wherein the interlacing scheme comprises a plurality of PRB-level interlacing schemes, wherein a respective PRB-level interlacing scheme is determined within each subchannel of the set of subchannels, wherein the interlacing scheme corresponds to a set of non-contiguous PRBs distributed across each subchannel of the set of subchannels, and wherein each subchannel comprises a plurality of interleaved PRBs that satisfies a minimum occupied bandwidth; and transmit a sidelink transmission over a sidelink channel according to the interlacing scheme, the sidelink channel comprising a sidelink data channel or a sidelink control channel.

2. The UE of claim 1, wherein the resource pool configuration indicates a subchannel size, wherein a resource pool size is not a multiple of the subchannel size, and wherein the interlacing configuration further indicates a bitmap of remaining PRBs.

3. The UE of claim 2, wherein a set of remaining PRBs are configured as empty PRBs in a middle of the resource pool.

4. The UE of claim 2, wherein a set of remaining PRBs are allocated to at least one subchannel having a second subchannel size different than the subchannel size indicated in the resource pool configuration.

5. The UE of claim 1, wherein the interlacing configuration comprises multiple subchannel sizes and a bitmap of subchannel indices for each subchannel size.

6. The UE of claim 1, wherein at least one PRB-level interlacing scheme of the plurality of PRB-level interlacing schemes extends across multiple subchannels.

7. The UE of claim 1, wherein the plurality of PRB-level interlacing schemes comprises a first PRB-level interlacing scheme having allocations starting from a lowest PRB in each subchannel belonging to the resource pool, and wherein the interlacing configuration further indicates a second PRB-level interlacing scheme having allocations starting from a second lowest PRB in each subchannel belonging to the resource pool.

8. The UE of claim 1, wherein the interlacing configuration further indicates the interlacing scheme, and wherein the interlacing scheme has allocations starting from both ends of the resource pool, the allocations continuing towards a middle of the resource pool.

9. The UE of claim 8, wherein the interlacing scheme comprises at least one of PRB-level interlacing and sub-channel-level interlacing.

10. The UE of claim 1, wherein the resource pool corresponds to the LBT subband.

11. The UE of claim 1, wherein the interlacing configuration further indicates an interleaving scheme for multiple resource pools that occupy the LBT subband.

12. The UE of claim 11, wherein a first resource pool of the multiple resource pools has a different subcarrier size than a second resource pool.

13. The UE of claim 11, wherein a first resource pool of the multiple resource pools has a different number of subcarriers than a second resource pool.

14. A method performed by a User Equipment ("UE"), the method comprising:

receiving a resource pool configuration for sidelink, wherein the resource pool configuration indicates a resource pool comprising a plurality of physical resource blocks ("PRBs") corresponding to a Listen-Before-Talk ("LBT") subband, each PRB comprising a set of subcarriers;

receiving an interlacing configuration associated with the resource pool configuration, wherein the interlacing configuration indicates a set of subchannels within the resource pool and a number of interlaces for each subchannel of the set of subchannels, and wherein the number of interlaces is based at least in part on a subcarrier spacing of the resource pool;

determining an interlacing scheme based at least in part on the interlacing configuration and the resource pool, wherein the interlacing scheme comprises a plurality of PRB-level interlacing schemes, wherein a respective PRB-level interlacing scheme is determined within each subchannel of the set of subchannels, wherein the interlacing scheme corresponds to a set of non-contiguous PRBs distributed across each subchannel of the set of subchannels, and wherein each subchannel comprises a plurality of interleaved PRBs that satisfies a minimum occupied bandwidth; and transmitting a sidelink transmission over a sidelink channel according to the interlacing scheme, the sidelink channel comprising a sidelink data channel or a sidelink control channel.

15. A base station for wireless communication, comprising:

at least one memory; and at least one processor coupled with the at least one memory and configured to cause the base station to:

transmit a resource pool configuration to a user equipment ("UE") for sidelink, wherein the resource pool configuration indicates a resource pool comprising a plurality of physical resource blocks ("PRBs"), each PRB comprising a set of subcarriers; and transmit, to the UE, an interlacing configuration associated with the resource pool configuration, wherein the interlacing configuration indicates a set of subchannels within the resource pool and a number of interlaces for each subchannel of the set of subchannels, wherein the number of interlaces is based at least in part on a subcarrier spacing of the resource pool, and wherein the interlacing configuration further indicates an interlacing scheme for multiple resource pools corresponding to a Listen-Before-Talk ("LBT") subband, wherein the interleaving scheme corresponds to a set of non-contiguous PRBs distributed across each subchannel of the set of subchannels, and wherein each subchannel comprises a plurality of interleaved PRBs that satisfies a minimum occupied bandwidth.

16. The base station of claim 15, wherein the resource pool corresponds to a Listen-Before-Talk ("LBT") subband.

17. The base station of claim 15, wherein the resource pool configuration indicates a subchannel size, wherein a resource pool size is not a multiple of the subchannel size, and wherein the interlacing configuration further indicates a bitmap of remaining PRBs.

18. A method performed by a base station, the method comprising:

transmitting a resource pool configuration to a user equipment ("UE") for sidelink, wherein the resource pool configuration indicates a resource pool comprising a plurality of physical resource blocks ("PRBs"), each PRB comprising a set of subcarriers; and transmitting, to the UE, an interlacing configuration associated with the resource pool configuration, wherein the interlacing configuration indicates a set of subchannels within the resource pool and a number of interlaces for each subchannel of the set of subchannels, and wherein the number of interlaces is based at least in part on a subcarrier spacing of the resource pool, and wherein the interlacing configuration further indicates an interleaving scheme for multiple resource pools corresponding to a Listen-Before-Talk ("LBT") subband, wherein the interleaving scheme corresponds to a set of non-contiguous PRBs distributed across each subchannel of the set of subchannels, and wherein each subchannel comprises a plurality of interleaved PRBs that satisfies a minimum occupied bandwidth.

* * * * *